US012800882B2

(12) United States Patent
Cao

(10) Patent No.: US 12,800,882 B2
(45) Date of Patent: Nov. 17, 2026

(54) CAMERA OPTICAL LENS

(71) Applicant: Changzhou AAC Raytech Optronics Co., Ltd., Changzhou City (CN)

(72) Inventor: Xin Cao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 174 days.

(21) Appl. No.: 18/977,842

(22) Filed: Dec. 11, 2024

(65) Prior Publication Data

US 2026/0086326 A1 Mar. 26, 2026

Related U.S. Application Data

(63) Continuation of application No. PCT/CN2024/120333, filed on Sep. 23, 2024.

(51) Int. Cl.
*G02B 13/00* (2006.01)
*G02B 9/60* (2006.01)
*G03B 30/00* (2021.01)

(52) U.S. Cl.
CPC ........... *G02B 13/0045* (2013.01); *G02B 9/60* (2013.01); *G03B 30/00* (2021.01)

(58) Field of Classification Search
CPC ...... G02B 13/0045; G02B 9/60; G02B 13/18; G02B 15/145109; G02B 359/714; G02B 359/764; G03B 30/00
See application file for complete search history.

(56) References Cited

U.S. PATENT DOCUMENTS

2016/0131869 A1* 5/2016 Liao .................. G02B 13/0045 359/714
2019/0346661 A1* 11/2019 Yeh .................... G02B 13/0045
2020/0201003 A1* 6/2020 Chiang .......... G02B 15/145109
2020/0225451 A1* 7/2020 Xu ........................... G02B 9/60
2021/0231922 A1* 7/2021 Sekine ..................... G02B 9/60
2026/0140390 A1* 5/2026 Shabtay ................. G02B 1/041

* cited by examiner

*Primary Examiner* — Matthew Y Lee
(74) *Attorney, Agent, or Firm* — Viersch Law Group

(57) ABSTRACT

The present disclosure relates to the field of optical lenses, and more specifically to a camera optical lens. The camera optical lens includes five lenses, which include, from an object side to an image side in sequence: a first lens having a positive refractive power, a second lens having a negative refractive power, a third lens having a negative refractive power, a fourth lens having a positive refractive power, and a fifth lens having a negative refractive power. The camera optical lens satisfies following relationships:

$$0.20 \leq d6/TTL \leq 0.36;$$

$$6.00 \leq (f4 - f5)/f1 \leq 10.10;$$

$$-1.00 \leq (R5 + R6)/(R5 - R6) \leq -0.70; \text{ and}$$

$$-0.80 \leq (R9 + R10)/f \leq -0.39.$$

10 Claims, 11 Drawing Sheets

Longitudinal aberration mm

Lateral color

µm

CAMERA OPTICAL LENS

CROSS REFERENCE TO RELATED APPLICATIONS

The present application is a continuation of PCT Patent Application No. PCT/CN2024/120333, entitled "CAMERA OPTICAL LENS," filed Sep. 23, 2024, which is incorporated herein by reference in its entirety.

TECHNICAL FIELD

The present disclosure relates to optical lens, in particular to a camera optical lens suitable for handheld devices, such as smart phones and digital cameras, and imaging devices, such as monitors, PC lens and vehicle-mounted lens.

BACKGROUND

With the emergence of smart devices in recent years, the demand for miniature camera optical lens is increasing day by day. Due to the reduction in pixel size of photosensitive devices, coupled with the current development trend of electronic products being that their functions should be better and their shape should be thin and small, miniature camera optical lens with good imaging quality therefor has become a mainstream in the market. In order to obtain better imaging quality, the lens adopts a multiple-piece lens structure. And, with the development of technology and the increase of the diverse demands of users, and under this circumstances that the pixel area of photosensitive devices is shrinking steadily and the requirement of the system for the imaging quality is improving constantly, the five-piece lens structure gradually appear in lens design. There is an urgent need for long-focus camera lenses which have good optical characteristics, large aperture, long focal length, ultra-thinness, and the chromatic aberration of which is fully corrected.

SUMMARY

In view of the above, the present disclosure is intended to provide a camera optical lens, which has good optical characteristics and satisfies the design requirements of the chromatic aberration of which is fully corrected, large aperture, long focal length, and ultra-thinness.

In order to achieve the above objective, a solution of the present disclosure provides a camera optical lens. The camera optical lens includes five lenses. The five lenses include, from an object side to an image side in sequence: a first lens having a positive refractive power, a second lens having a negative refractive power, a third lens having a negative refractive power, a fourth lens having a positive refractive power, and a fifth lens having a negative refractive power. The camera optical lens satisfies following relationships: $0.20 \le d6/TTL \le 0.36$; $6.00 \le (f4-f5)/f1 \le 10.10$; $-1.00 \le (R5+R6)/(R5-R6) \le -0.70$; and $-0.80 \le (R9+R10)/f \le -0.39$. Where, d6 represents an on-axis distance from the image-side surface of the third lens to an object-side surface of the fourth lens, TTL represents a total track length of the camera optical lens, f1 represents a focal length of the first lens, f4 represents a focal length of the fourth lens, f5 represents a focal length of the fifth lens, R5 represents a central curvature radius of an object-side surface in a paraxial region of the third lens, R6 represents a central curvature radius of an image-side surface in a paraxial region of the third lens, R9 represents a central curvature radius of an object-side surface in a paraxial region of the fifth lens, R10 represents a central curvature radius of an image-side surface in a paraxial region of the fifth lens, and f represents a focal length of the camera optical lens.

As an improvement, the camera optical lens further satisfies a following relationship: $1.50 \le d1/(d3+d5) \le 3.50$. Where, d1 represents an on-axis thickness of the first lens, d3 represents an on-axis thickness of the second lens, and d5 represents an on-axis thickness of the third lens.

As an improvement, the camera optical lens further satisfies a following relationship: $0.39 \le SD11*SAG11/IH \le 0.65$. Where, SD11 represents an effective radius of the object-side surface of the first lens, SAG11 represents an on-axis distance from an intersection point of the object-side surface of the first lens and the optical axis to a vertex of the effective radius of the object-side surface of the first lens, and IH represents an image height of 1.0H of the camera optical lens.

As an improvement, an object-side surface of the first lens is convex in a paraxial region and an image-side surface of the first lens is convex in the paraxial region. The camera optical lens further satisfies a following relationship: $0.18 \le f1/f \le 0.65$; $-1.44 \le (R1+R2)/(R1-R2) \le -0.42$; and $0.08 \le d1/TTL \le 0.32$; where R1 represents a central curvature radius of the object-side surface in a paraxial region of the first lens, R2 represents a central curvature radius of the image-side surface in a paraxial region of the first lens, and d1 represents an on-axis thickness of the first lens.

As an improvement, the object-side surface of the second lens is convex in a paraxial region and an image-side surface of the second lens is concave in the paraxial region. The camera optical lens further satisfies a following relationship: $-1.89 \le f2/f \le -0.49$; $0.75 \le (R3+R4)/(R3-R4) \le 5.28$; and $0.02 \le d3/TTL \le 0.10$; where f2 represents a focal length of the second lens, R3 represents a central curvature radius of the object-side surface in a paraxial region of the second lens, R4 represents a central curvature radius of an image-side surface in a paraxial region of the second lens, and d3 represents an on-axis thickness of the second lens.

As an improvement, the object-side surface of the third lens is concave in a paraxial region and the image-side surface of the third lens is concave in the paraxial region. The camera optical lens further satisfies a following relationship: $-2.84 \le f3/f \le -0.35$; and $0.01 \le d5/TTL \le 0.06$; where f3 represents a focal length of the third lens, and d5 represents an on-axis thickness of the third lens.

As an improvement, an object-side surface of the fourth lens is concave in a paraxial region and an image-side surface of the fourth lens is convex in a paraxial region. The camera optical lens further satisfies a following relationship: $0.53 \le f4/f \le 2.26$; $1.30 \le (R7+R8)/(R7-R8) \le 10.54$; and $0.04 \le d7/TTL \le 0.14$; where R7 represents a central curvature radius of an object-side surface in a paraxial region of the fourth lens, R8 represents a central curvature radius of the image-side surface in a paraxial region of the fourth lens, and d7 represents an on-axis thickness of the fourth lens.

As an improvement, an object-side surface of the fifth lens is concave in a paraxial region and an image-side surface of the fifth lens is convex in the paraxial region. The camera optical lens further satisfies a following relationship: $-5.46 \le f5/f \le -0.73$; $-16.50 \le (R9+R10)/(R9-R10) \le -2.05$; and $0.03 \le d9/TTL \le 0.20$; where d9 represents an on-axis thickness of the fifth lens.

As an improvement, the camera optical lens further satisfies a following relationship: $f/FOV \ge 8.10$; where FOV represents a field of view of 1.0H of the camera optical lens.

As an improvement, the camera optical lens further satisfies a following relationship: FNO≤2.40; where FNO represents an aperture value of the camera optical lens.

The present disclosure has the beneficial effects in that: the camera optical lens according to the present disclosure has good optical performance, has the characteristics of the chromatic aberration of which is fully corrected, large aperture, long focal length, and ultra-thinness and is particularly suitable for mobile phone camera lens assemblies, WEB camera lenses and vehicle-mounted lens composed of camera elements such as charge coupled device (CCD) or complementary metal-oxide semiconductor sensor (CMOS sensor) for high pixels.

BRIEF DESCRIPTION OF THE DRAWINGS

In order to more clearly illustrate the technical solutions in the embodiments of the present disclosure, the accompanying drawings to be used in the description of the embodiments will be briefly described below, and it is obvious that the accompanying drawings in the following description are only some of the embodiments of the present disclosure, and that, for a person of ordinary skill in the art, it is possible to obtain other drawings based on these drawings without any creative effort.

DETAILED DESCRIPTION OF THE EMBODIMENTS

Figure 1:
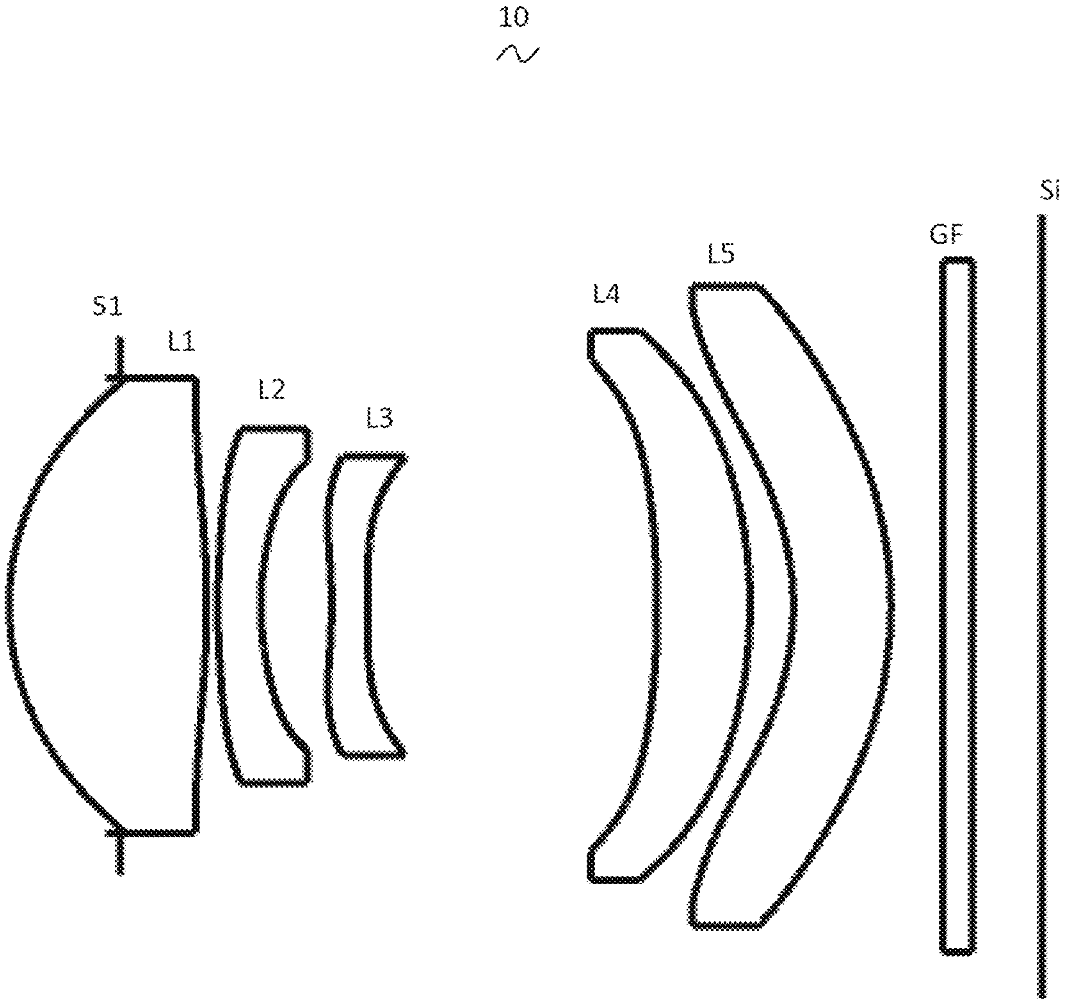
FIG. 1 is a schematic diagram of a camera optical lens in accordance with a first embodiment of the present disclosure.

In order to make the objectives, technical solutions and advantages of the present disclosure clearer, various embodiments of the present disclosure will be described in detail below in connection with the accompanying drawings. However, a person of ordinary skill in the art should understand that in the various embodiments of the present disclosure, a number of technical details have been proposed in order to enable the reader to better understand the present disclosure. However, even without these technical details and various variations and modifications based on the following embodiments, the technical solutions claimed to be protected by the present disclosure can be realized.

As referring to FIG. 1 to FIG. 20, solutions of the present disclosure provide a camera optical lens 10, 20, 30, 40 and 50. FIG. 1, FIG. 5, FIG. 9, FIG. 13 and FIG. 17 show the camera optical lens 10, 20, 30, 40 and 50 of the present disclosure, respectively. The camera optical lens 10, 20, 30, 40 and 50 include 5 lenses, respectively. Specifically, from the object side to the image side, the camera optical lens includes in sequence: an aperture S1, a first lens L1, a second lens L2, a third lens L3, a fourth lens L4, and a fifth lens L5. Optical element like optical filter GF can be arranged between the fifth lens L5 and the image surface Si.

The first lens L1 is made of plastic material, the second lens L2 is made of plastic material, the third lens L3 is made of plastic material, the fourth lens L4 is made of plastic material, and the fifth lens L5 is made of plastic material. Each lens may also be made of other materials.

The on-axis distance from the image-side surface of the third lens L3 to the object-side surface of the fourth lens L4 is defined as d6, and the total track length of the camera optical lens is defined as TTL. The following relationship formula: $0.20 \leq d6/TTL \leq 0.36$ should be satisfied. By the relationship formula, a ratio of the air spacing between the third lens L3 and the fourth lens L4 to the total optical length is specified. Within the range of the relationship formula, it is conducive to reducing the total optical length of the whole camera optical lens, and it is beneficial for realization of the ultra-thin lens.

The focal length of the first lens L1 is defined as f1, the focal length of the fourth lens L4 is defined as f4 and the focal length of the fifth lens L5 is defined as f5. The relationship formula $6.00 \leq (f4-f5)/f1 \leq 10.10$ should be satisfied. By the relationship formula, a ratio of the difference between the focal length of the fourth lens and the focal length of the fifth lens to the focal length of the first lens is specified. Within the range of the relationship formula, it can effectively balance the field curvature of the system, so that the offset of the field curvature at the central field of view is less than 0.025 mm.

The central curvature radius of the object-side surface in a paraxial region of the third lens L3 is defined as R5, and the central curvature radius of the image-side surface in a paraxial region of the third lens L3 is defined as R6. The relationship formula $-1.00 \leq (R5+R6)/(R5-R6) \leq -0.70$ should be satisfied. By the relationship formula, the shape of the third lens is specified. Within the range of the relationship formula, a degree of deflection of light passing through the lens can be alleviated, and aberrations can be effectively corrected, thus enabling the chromatic aberration to satisfy $|LC| \leq 1.0$ μm.

The central curvature radius of the object-side surface in a paraxial region of the fifth lens L5 is defined as R9, the central curvature radius of the image-side surface in a paraxial region of the fifth lens L5 is defined as R10, and the focal length of the whole camera optical lens is defined as f. The following relationship formula should be satisfied: $-0.80 \leq (R9+R10)/f \leq -0.39$, by which, the shape of the fifth lens L5 is specified. Within the range of the relationship formula, it is conducive to correcting the astigmatism and distortion of the camera optical lens, to enable the distortion to satisfy $|Distortion| \leq 1.1\%$, such that the generation of dark corners can be reduced.

When the above relationship formulas are satisfied, each of the camera optical lenses 10, 20, 30, 40 and 50 has good optical performance and can meet the design requirement of large aperture, long focal length and ultra-thinness. According to the characteristics of the camera optical lenses 10, 20, 30, 40 and 50, the camera optical lenses 10, 20, 30, 40, and 50 are particularly suitable for mobile phone camera lens assemblies and WEB camera lenses composed of camera elements such as charge coupled device (CCD) or complementary metal-oxide semiconductor sensor (CMOS sensor) for high pixels.

Based on the above relationship formulas and the functions that can be realized, the characteristics of each lens of the lenses are further refined as follows.

The on-axis thickness of the first lens L1 is defined as d1, the on-axis thickness of the second lens L2 is defined as d3, and the on-axis thickness of the third lens L3 is defined as d5. The following relationship formula should be satisfied: $1.50 \leq d1/(d3+d5) \leq 3.50$, by which, a ratio of the on-axis thickness of the first lens, the on-axis thickness of the second lens and the on-axis thickness of the third lens is specified. Within the range of the relationship formula, it is conducive to reducing the total optical length of the whole camera optical lens, and it is beneficial for realization of ultra-thinness.

The effective radius of the object-side surface of the first lens is defined as SD11, the on-axis distance from an intersection point of the object-side surface of the first lens and the optical axis to a vertex of the effective radius of the object-side surface of the first lens is defined as SAG11, and the image height of 1.0H of the camera optical lens is defined as is IH. The following relationship formula should be satisfied: $0.39 \leq SD11*SAG11/IH \leq 0.65$, by which, the shape of the first lens is specified. Within the range of the relationship formula, it is beneficial for the processing and assembly of the lens.

An object-side surface of the first lens L1 is convex in a paraxial region and the image-side surface of the first lens L1 is convex in the paraxial region, and the first lens L1 has a positive refractive power. The object-side surface and image-side surface of the first lens L1 may also be provided in other concave and convex distributions.

The focal length f of the whole camera optical lens and the focal length f1 of the first lens L1 satisfy the following relationship formula: $0.18 \leq f1/f \leq 0.65$, by which, a ratio of the focal length of the first lens L1 to the focal length f of the whole camera optical lens is specified. Within the specified range, the first lens L1 has an appropriate positive refractive power, which is conducive to reducing systematic aberration, and at the same time is conducive to the development of the lens to ultra-thin and wide-angle. Preferably, the relationship formula $0.29 \leq f1/f \leq 0.52$ should be satisfied.

The central curvature radius of the object-side surface in a paraxial region of the first lens L1 is defined as R1, the central curvature radius of the image-side surface in a paraxial region of the first lens L1 is defined as R2. The following relationship formula should be satisfied: $-1.44 \leq (R1+R2)/(R1-R2) \leq -0.42$. By reasonably controlling the shape of the first lens L1, the first lens L1 can effectively correct the system spherical aberration. Preferably, the relationship formula $-0.90 \leq (R1+R2)/(R1-R2) \leq -0.52$ should be satisfied.

The on-axis thickness of the first lens L1 is defined as d1, and the total track length of the camera optical lens is defined as TTL. The following relationship formula: $0.08 \leq d1/TTL \leq 0.32$ should be satisfied. Within the range of the relationship formula, it is beneficial for realization of miniaturization. Preferably, the relationship formula $0.13 \leq d1/TTL \leq 0.26$ should be satisfied.

The object-side surface of the second lens L2 is convex in a paraxial region and an image-side surface of the second lens L2 is concave in the paraxial region, and the second lens L2 has a negative refractive power. The object-side surface and the image-side surface of the second lens L2 may also be provided in other concave and convex distributions.

The focal length of the second lens L2 is defined as f2, satisfying the following relationship formula: $-1.89 \leq f2/f \leq -0.49$. By controlling the negative focal power of the second lens L2 in a reasonable range, it is conducive to correct systematic aberration. Preferably, the relationship formula $-1.18 \leq f2/f \leq -0.62$ should be satisfied.

The central curvature radius of the object-side surface in a paraxial region of the second lens L2 is defined as R3, the central curvature radius of the image-side surface in a paraxial region of the second lens L2 is defined as R4. The following relationship formula should be satisfied: $0.75 \leq (R3+R4)/(R3-R4) \leq 5.28$, which specifies the shape of the second lens L2. Within the range of the relationship formula, it is beneficial to correct the problem of on-axis color aberration with the development of lenses to ultra-thin and wide-angle. Preferably, the relationship formula $1.20 \leq (R3+R4)/(R3-R4) \leq 4.22$ should be satisfied.

The on-axis thickness of the second lens L2 is defined as d3, and the total track length of the camera optical lens is defined as TTL. The following relationship formula: $0.02 \leq d3/TTL \leq 0.10$ should be satisfied. Within the range of the relationship formula, it is beneficial for realization of miniaturization. Preferably, the relationship formula $0.03 \leq d3/TTL \leq 0.08$ should be satisfied.

The object-side surface of the third lens L3 is concave in a paraxial region and the image-side surface of the third lens L3 is concave in the paraxial region, and the third lens L3 has a negative refractive power. The object and image-side surfaces of the third lens L3 may also be provided in other concave and convex distributions.

The focal length of the whole camera optical lens is defined as f, and the focal length of the third lens L3 is defined as f3. The following relationship formula: −2.84≤f3/f≤−0.35 should be satisfied. The system is made to have better imaging quality and lower sensitivity by reasonably distributing the optical focal length of the camera optical lens. Preferably, the relationship formula −1.77≤f3/f≤−0.44 should be satisfied.

The on-axis thickness of the third lens L3 is defined as d5, and the total track length of the camera optical lens is defined as TTL. The following relationship formula: 0.01≤d5/TTL≤0.06 should be satisfied. Within the range of the relationship formula, it is beneficial for realization of miniaturization. Preferably, the relationship formula 0.02≤d5/TTL≤0.05 should be satisfied.

The object-side surface of the fourth lens L4 is concave in a paraxial region and the image-side surface of the fourth lens L4 is convex in the paraxial region, and the fourth lens L4 has a positive refractive power. The image-side surface of the fourth lens L4 may also be provided in other concave and convex distributions.

The focal length of the whole camera optical lens is defined as f, and the focal length of the fourth lens L4 is f4. The following relationship formula should be satisfied: 0.53≤f4/f≤2.26. The system is made to have better imaging quality and lower sensitivity by reasonably distributing the optical focal length of the camera optical lens. Preferably, the relationship formula 0.85≤f4/f≤1.81 should be satisfied.

The central curvature radius of the object-side surface in a paraxial region of the fourth lens L4 is defined as R7, the central curvature radius of the image-side surface in a paraxial region of the fourth lens L4 is defined as R8. The following relationship formula should be satisfied: 1.30≤(R7+R8)/(R7−R8)≤10.54, by which, the shape of the fourth lens L4 is specified. Within the range of the relationship formula, it is conducive to correcting a problem of an off-axis aberration with the development into the direction of ultra-thin and wide-angle lenses. Preferably, the following relationship formula should be satisfied, 2.08≤(R7+R8)/(R7−R8)≤8.43.

The on-axis thickness of the fourth lens L4 is defined as d7, and the total track length of the camera optical lens is defined as TTL. The following relationship formula: 0.04≤d7/TTL≤0.14 should be satisfied. With the range of the relationship formula, it is beneficial for realization of miniaturization. Preferably, the relationship formula 0.06≤d7/TTL≤0.11 should be satisfied.

The object-side surface of the fifth lens L5 is concave in a paraxial region and the image-side surface of the fifth lens L5 is convex in the paraxial region, and the fifth lens L5 has a negative refractive power. The object-side surface and image-side surface of the fifth lens L5 may also be provided in other concave and convex distributions.

The focal length of the whole camera optical lens is defined as f, and the focal length of the fifth lens L5 is f5. The following relationship formula should be satisfied: −5.46≤f5/f≤−0.73, which can effectively smooth the light angles of the camera optical lens and reduce the tolerance sensitivity. Preferably, the relationship formula −3.42≤f5/f≤−0.91 should be satisfied.

The central curvature radius of the object-side surface in a paraxial region of the fifth lens L5 is defined as R9, the central curvature radius of the image-side surface in a paraxial region of the fifth lens L5 is defined as R10. The following relationship formula should be satisfied: −16.50≤(R9+R10)/(R9−R10)≤−2.05, by which, the shape of the fifth lens L5 is specified. Within the range of the relationship formula, it is conducive to correcting a problem of an off-axis aberration with the development into the direction of ultra-thin and wide-angle lenses. Preferably, the following relationship formula should be satisfied, −10.31≤(R9+R10)/(R9−R10)≤−2.56.

The on-axis thickness of the fifth lens L5 is defined as d9, and the total track length of the camera optical lens is defined as TTL. The following relationship formula: 0.03≤d9/TTL≤0.20 should be satisfied. Within the range of the relationship formula, it is beneficial for realization of miniaturization. Preferably, the relationship formula 0.05≤d9/TTL≤0.16 should be satisfied.

The focal length of the whole camera optical lens is defined as f, and The field of view of 1.0H of the camera optical lens is defined as FOV. The relationship formula f/FOV≥8.10 should be satisfied. Within the range of the relationship formula, it is beneficial for realization of wide angle.

The aperture value (focal number, FNO) of the camera optical lens is less than or equal to 2.40, thereby realizing a large aperture, such that the camera optical lens has good imaging performance.

The camera optical lens of the present disclosure will be explained with specific embodiments illustrated below. The symbols described in each embodiment are shown below. The unit of the focal length, the on-axis distance, the central curvature radius, and the on-axis thickness is mm.

TTL: total track length (the on-axis distance from the object-side surface of the first lens L1 to the image surface Si), and unit of the TTL being in mm.

Aperture value (focal number, FNO): a ratio of the effective focal length of the camera optical lens to the diameter of the pupil.

The technical proposal of the present disclosure will be described in detail in five embodiments.

First Embodiment

Table 1 and table 2 show design data of the camera optical lens 10 according to the first embodiment of the present disclosure.

TABLE 1

| | R | | d | | nd | | vd |
|---|---|---|---|---|---|---|---|
| S1 | ∞ | d0= | −0.768 | | | | |
| R1 | 1.969 | d1= | 1.371 | nd1 | 1.5444 | v1 | 55.82 |
| R2 | −8.468 | d2= | 0.077 | | | | |
| R3 | 4.100 | d3= | 0.300 | nd2 | 1.6700 | v2 | 19.39 |
| R4 | 1.973 | d4= | 0.493 | | | | |
| R5 | −3.411 | d5= | 0.249 | nd3 | 1.5444 | v3 | 55.82 |
| R6 | 42.065 | d6= | 2.016 | | | | |
| R7 | −6.938 | d7= | 0.647 | nd4 | 1.6700 | v4 | 19.39 |
| R8 | −3.457 | d8= | 0.301 | | | | |
| R9 | −1.956 | d9= | 0.677 | nd5 | 1.5444 | v5 | 55.82 |
| R10 | −2.880 | d10= | 0.360 | | | | |

TABLE 1-continued

| | R | d | | nd | | vd | |
|---|---|---|---|---|---|---|---|
| R11 | ∞ | d11= | 0.210 | ndg | 1.5168 | vg | 64.17 |
| R12 | ∞ | d12= | 0.480 | | | | |

The meaning of the various symbols is as follows.

S1: aperture;

R: the curvature radius at the center of the optical surface;

R1: the central curvature radius of the object-side surface in a paraxial region of the first lens L1;

R2: the central curvature radius of the image-side surface in a paraxial region of the first lens L1;

R3: the central curvature radius of the object-side surface in a paraxial region of the second lens L2;

R4: the central curvature radius of the image-side surface in a paraxial region of the second lens L2;

R5: the central curvature radius of the object-side surface in a paraxial region of the third lens L3;

R6: the central curvature radius of the image-side surface in a paraxial region of the third lens L3;

R7: the central curvature radius of the object-side surface in a paraxial region of the fourth lens L4;

R8: the central curvature radius of the image-side surface in a paraxial region of the fourth lens L4;

R9: the central curvature radius of the object-side surface in a paraxial region of the fifth lens L5;

R10: the central curvature radius of the image-side surface in a paraxial region of the fifth lens L5;

R11: the central curvature radius of the object-side surface in a paraxial region of the optical filter GF;

R12: the central curvature radius of the image-side surface in a paraxial region of the optical filter GF;

d: the on-axis thickness of the lens and the on-axis distance between the lenses;

d0: the on-axis distance from the aperture S1 to the object-side surface of the first lens L1;

d1: the on-axis thickness of the first lens L1;

d2: the on-axis distance from the image-side surface of the first lens L1 to the object-side surface of the second lens L2;

d3: the on-axis thickness of the second lens L2;

d4: the on-axis distance from the image-side surface of the second lens L2 to the object-side surface of the third lens L3;

d5: the on-axis thickness of the third lens L3;

d6: the on-axis distance from the image-side surface of the third lens L3 to the object-side surface of the fourth lens L4;

d7: the on-axis thickness of the fourth lens L4;

d8: the on-axis distance from the image-side surface of the fourth lens L4 to the object-side surface of the fifth lens L5;

d9: the on-axis thickness of the fifth lens L5;

d10: the on-axis distance from the image-side surface of the fifth lens L5 to the object-side surface of the optical filter GF;

d11: the on-axis thickness of the optical filter GF;

d12: the on-axis distance from the image-side surface of the optical filter GF to the image surface S1;

nd: the refractive index of the d line (the d line refers to green light with a wavelength of 550 nm);

nd1: the refractive index of the d line of the first lens L1;

nd2: the refractive index of the d line of the second lens L2;

nd3: the refractive index of the d line of the third lens L3;

nd4: the refractive index of the d line of the fourth lens L4;

nd5: the refractive index of the d line of the fifth lens L5;

ndg: the refractive index of the d line of the optical filter GF;

vd: the abbe number;

v1: the abbe number of first lens L1;

v2: the abbe number of second lens L2;

v3: the abbe number of the third lens L3;

v4: the abbe number of the fourth lens L4;

v5: the abbe number of the fifth lens L5; and vg: the abbe number of the optical filter GF.

Table 2 shows aspherical data of each of the lenses in the camera optical lens 10 according to the first embodiment of the present disclosure.

TABLE 2

| | Conic coefficient | Aspheric surface coefficients | | | | |
|---|---|---|---|---|---|---|
| | k | A4 | A6 | A8 | A10 | A12 |
| R1 | 7.7647E−02 | −2.1660E−02 | 9.9110E−02 | −2.9923E−01 | 5.5260E−01 | −6.5961E−01 |
| R2 | −4.4191E+01 | −2.1923E−01 | 1.3746E+00 | −5.1494E+00 | 1.3240E+01 | −2.4054E+01 |
| R3 | −6.7302E+01 | −2.6569E−01 | 1.7551E+00 | −7.3865E+00 | 2.1510E+01 | −4.3619E+01 |
| R4 | −8.9212E+00 | −1.7823E−01 | 2.4442E+00 | −2.1805E+01 | 1.3942E+02 | −6.2013E+02 |
| R5 | −9.9000E+01 | 3.9174E−02 | −8.6138E−01 | 1.3110E+01 | −8.4119E+01 | 3.3376E+02 |
| R6 | 9.9000E+01 | 2.3898E−01 | 2.9580E−01 | −3.7603E+00 | 2.5656E+01 | −1.1776E+02 |
| R7 | −3.7355E+01 | −6.0311E−03 | −6.0480E−02 | 1.3438E−01 | −1.8806E−01 | 1.7419E−01 |
| R8 | 3.1514E−01 | 3.4731E−02 | −7.6048E−02 | 6.1073E−02 | −1.1775E−02 | −4.6049E−03 |
| R9 | −6.1957E+00 | −1.4837E−02 | −2.2353E−02 | −9.6511E−02 | 2.7777E−01 | −3.1734E−01 |
| R10 | −9.9229E+00 | −2.3293E−02 | 1.4214E−03 | −3.0483E−02 | 5.4182E−02 | −4.4508E−02 |

| | Conic coefficient | Aspheric surface coefficients | | | | |
|---|---|---|---|---|---|---|
| | k | A14 | A16 | A18 | A20 | / |
| R1 | 7.7647E−02 | 5.0890E−01 | −2.3925E−01 | 5.0194E−02 | 1.1461E−02 | |
| R2 | −4.4191E+01 | 3.1432E+01 | −2.9818E+01 | 2.0538E+01 | −1.0158E+01 | |
| R3 | −6.7302E+01 | 6.2569E+01 | −6.3848E+01 | 4.6022E+01 | −2.2885E+01 | / |
| R4 | −8.9212E+00 | 1.9461E+03 | −4.3507E+03 | 6.9416E+03 | −7.8348E+03 | / |
| R5 | −9.9000E+01 | −8.9513E+02 | 1.6798E+03 | −2.2319E+03 | 2.0893E+03 | / |
| R6 | 9.9000E+01 | 3.7393E+02 | −8.3603E+02 | 1.3244E+03 | −1.4770E+03 | / |
| R7 | −3.7355E+01 | −1.1104E−01 | 4.7882E−02 | −1.3000E−02 | 1.7538E−03 | / |

TABLE 2-continued

| | | | | | | |
|---|---|---|---|---|---|---|
| R8 | 3.1514E−01 | −1.2169E−02 | 2.1251E−02 | −1.4501E−02 | 5.6794E−03 | / |
| R9 | −6.1957E+00 | 2.1279E−01 | −9.3483E−02 | 2.8101E−02 | −5.8493E−03 | / |
| R10 | −9.9229E+00 | 2.1814E−02 | −6.8601E−03 | 1.3847E−03 | −1.6534E−04 | / |

For convenience, the aspherical surface of each lens surface is the aspherical surface shown in the following formula (1). However, the present disclosure is not limited to the aspherical polynomial form represented by the formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24} \quad (1)$$

Where, k represents the Conic coefficient, A4, A6, A8, A10, A12, A14, A16, A18, A20, A22, and A24 represent Aspheric surface coefficients, c represents curvature at the center of the optical surface, r represents the vertical distance between the point on the aspherical curve and the optical axis, and z represents the aspherical depth (the vertical distance between the point on the aspherical surface from the optical axis by r and a tangent plane tangent to the vertex on the optical axis of the aspherical surface).

Figure 2:
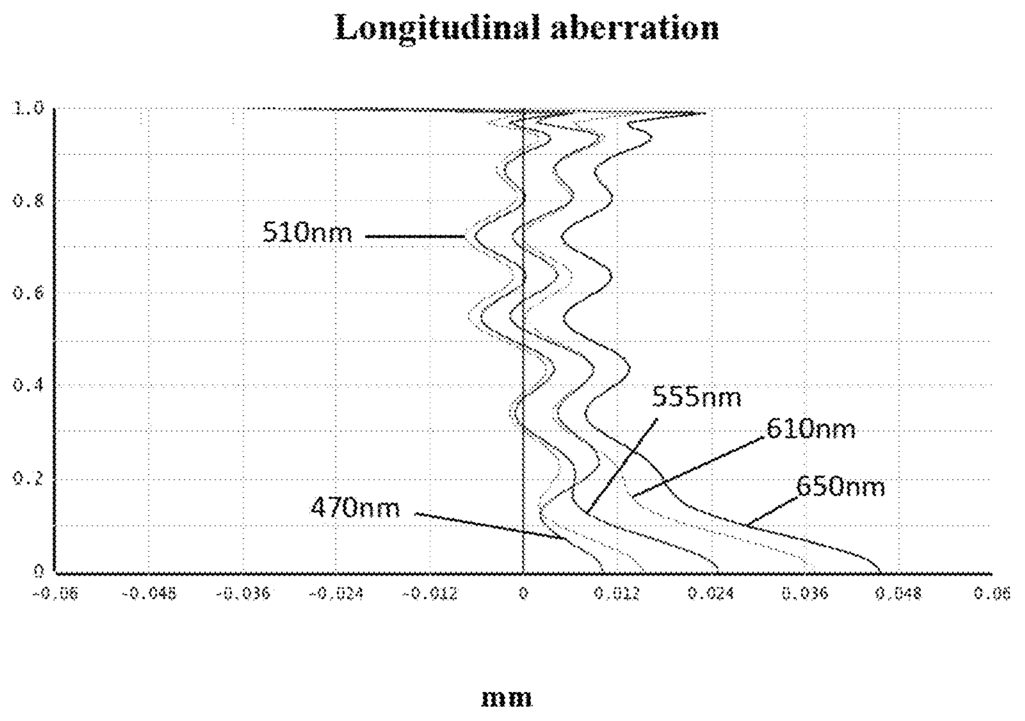
FIG. 2 shows the longitudinal aberration of the camera optical lens shown in FIG. 1.
Figure 3:
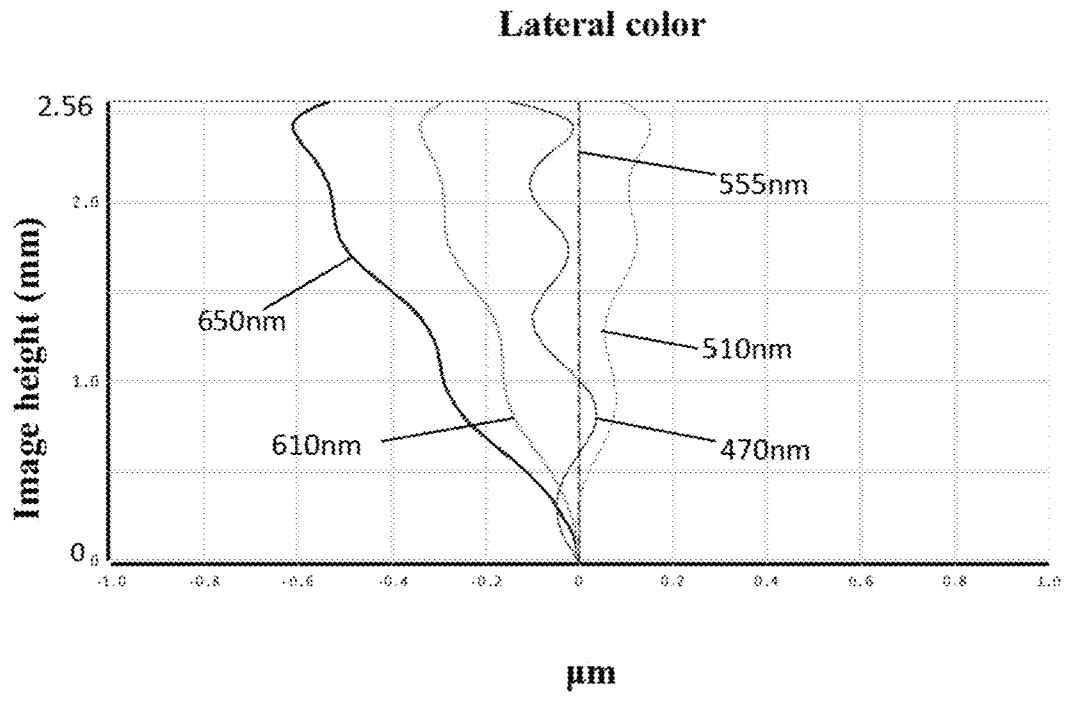
FIG. 3 shows the lateral color of the camera optical lens shown in FIG. 1.
Figure 4:
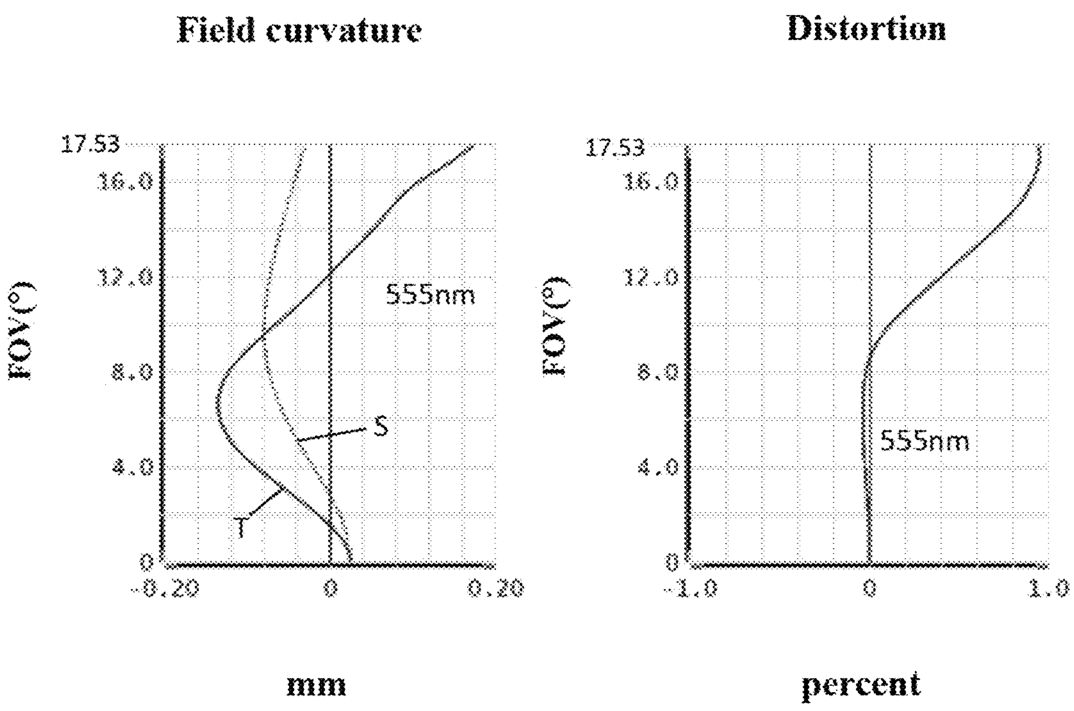
FIG. 4 presents a schematic diagram of the field curvature and distortion of the camera optical lens shown in FIG. 1.

FIG. 2 and FIG. 3 show the longitudinal aberration and lateral color schematic diagrams after light with a wavelength of 650 nm, 610 nm, 555 nm, 510 nm, and 470 nm passes the camera optical lens 10 in the first embodiment. FIG. 4 shows the field curvature and distortion schematic diagrams after light with a wavelength of 555 nm passes the camera optical lens 10 in the first embodiment, the field curvature S in FIG. 4 is a field curvature in the sagittal direction, T is a field curvature in the meridian direction.

In this embodiment, the pupil entering diameter (ENPD) of the camera optical lens 10 is 3.290 mm, the full field-of-view (1.0H) image-height IH is 2.560 mm, and the field of view (FOV) of the full field-of-view (1.0H) in the diagonal direction is 35.06°. The camera optical lens 10 meets the design requirements of large aperture, long focal length and ultra-thinness, and the on-axis and off-axis chromatic aberrations are fully corrected, thus having excellent optical characteristics.

It should be understood that the image height of 1.0H refers to half of the diagonal length of the effective pixel area of the sensor; the field of view (FOV) of 1.0H in the diagonal direction refers to the field of view corresponding to the effective pixel area of the sensor.

Second Embodiment

The meaning of symbols of the second embodiment is the same as that of the first embodiment.

Figure 5:
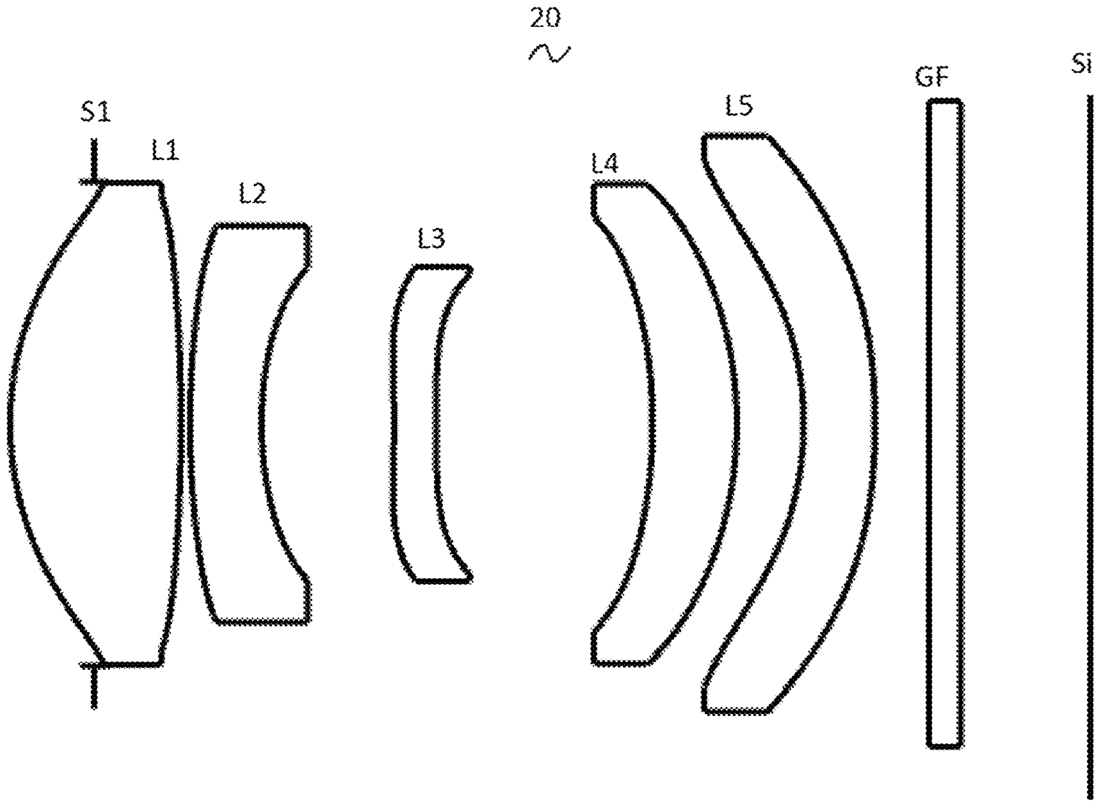
FIG. 5 is a schematic diagram of a camera optical lens in accordance with a second embodiment of the present disclosure.

FIG. 5 shows a camera optical lens 20 according to a second embodiment of the present disclosure.

Table 3 and table 4 show design data of the camera optical lens 20 according to the second embodiment of the present disclosure.

TABLE 3

| | R | | d | | nd | | vd |
|---|---|---|---|---|---|---|---|
| S1 | ∞ | d0= | −0.558 | | | | |
| R1 | 2.163 | d1= | 1.134 | nd1 | 1.5444 | v1 | 55.82 |
| R2 | −13.268 | d2= | 0.061 | | | | |
| R3 | 6.123 | d3= | 0.475 | nd2 | 1.6700 | v2 | 19.39 |
| R4 | 2.498 | d4= | 0.880 | | | | |
| R5 | −6.248 | d5= | 0.281 | nd3 | 1.5444 | v3 | 55.82 |
| R6 | 1521891275 | d6= | 1.440 | | | | |
| R7 | −3.447 | d7= | 0.560 | nd4 | 1.6700 | v4 | 19.39 |
| R8 | −2.588 | d8= | 0.443 | | | | |
| R9 | −2.176 | d9= | 0.474 | nd5 | 1.5444 | v5 | 55.82 |
| R10 | −4.272 | d10= | 0.360 | | | | |
| R11 | ∞ | d11= | 0.210 | ndg | 1.5168 | vg | 64.17 |
| R12 | ∞ | d12= | 0.861 | | | | |

Table 4 shows aspherical data of each lens in the camera optical lens 20 according to the second embodiment of the present disclosure.

TABLE 4

| | Conic coefficient | Aspheric surface coefficients | | | | |
|---|---|---|---|---|---|---|
| | k | A4 | A6 | A8 | A10 | A12 |
| R1 | −2.4617E−01 | 1.3608E−03 | −7.2419E−03 | 2.8237E−02 | −7.7926E−02 | 1.4174E−01 |
| R2 | −4.9034E+00 | −2.7916E−02 | 6.3530E−02 | 1.3415E−01 | −1.0258E+00 | 2.6638E+00 |
| R3 | −2.3007E+01 | −2.4464E−02 | 3.7756E−02 | 4.2959E−01 | −2.3246E+00 | 6.0798E+00 |
| R4 | −6.1222E+00 | 4.2054E−02 | 1.9087E−01 | −1.6460E+00 | 1.1271E+01 | −5.2373E+01 |
| R5 | −9.9000E+01 | 1.7701E−01 | −3.4359E−01 | 3.7596E+00 | −2.5868E+01 | 1.1809E+02 |
| R6 | −7.6404E+00 | 2.1455E−01 | −1.3806E−03 | −3.1925E−01 | 2.1320E+00 | −9.7736E+00 |
| R7 | −2.4051E+01 | −3.9291E−02 | −7.5204E−02 | 4.1354E−01 | −1.4460E+00 | 3.5390E+00 |
| R8 | −2.5623E−01 | 4.8663E−02 | −1.1350E−01 | 1.5728E−01 | −2.1082E−01 | 3.6696E−01 |
| R9 | −6.1372E+00 | −2.2876E−02 | −1.2161E−01 | 9.3233E−02 | 1.3507E−01 | −3.1329E−01 |
| R10 | −3.5664E+01 | −6.3205E−02 | −8.2092E−03 | −8.7004E−03 | 7.8641E−02 | −1.1628E−01 |

| | Conic coefficient | Aspheric surface coefficients | | | | |
|---|---|---|---|---|---|---|
| | k | A14 | A16 | A18 | A20 | / |
| R1 | −2.4617E−01 | −1.7839E−01 | 1.5750E−01 | −9.8168E−02 | 4.2909E−02 | / |
| R2 | −4.9034E+00 | −4.1168E+00 | 4.2270E+00 | −2.9922E+00 | 1.4703E+00 | / |
| R3 | −2.3007E+01 | −9.8965E+00 | 1.0729E+01 | −7.8924E+00 | 3.8993E+00 | / |

TABLE 4-continued

| | | | | | | |
|---|---|---|---|---|---|---|
| R4 | −6.1222E+00 | 1.6703E+02 | −3.7154E+02 | 5.8115E+02 | −6.3649E+02 | / |
| R5 | −9.9000E+01 | −3.7336E+02 | 8.3450E+02 | −1.3269E+03 | 1.4906E+03 | / |
| R6 | −7.6404E+00 | 3.3677E+01 | −8.7698E+01 | 1.6856E+02 | −2.3119E+02 | / |
| R7 | −2.4051E+01 | −6.0667E+00 | 7.2765E+00 | −6.1163E+00 | 3.5795E+00 | / |
| R8 | −2.5623E−01 | −5.6144E−01 | 5.9265E−01 | −4.2086E−01 | 2.0241E−01 | / |
| R9 | −6.1372E+00 | 2.9636E−01 | −1.7364E−01 | 6.9981E−02 | −2.0086E−02 | / |
| R10 | −3.5664E+01 | 9.5498E−02 | −5.1872E−02 | 1.9599E−02 | −5.1806E−03 | / |

Figure 6:
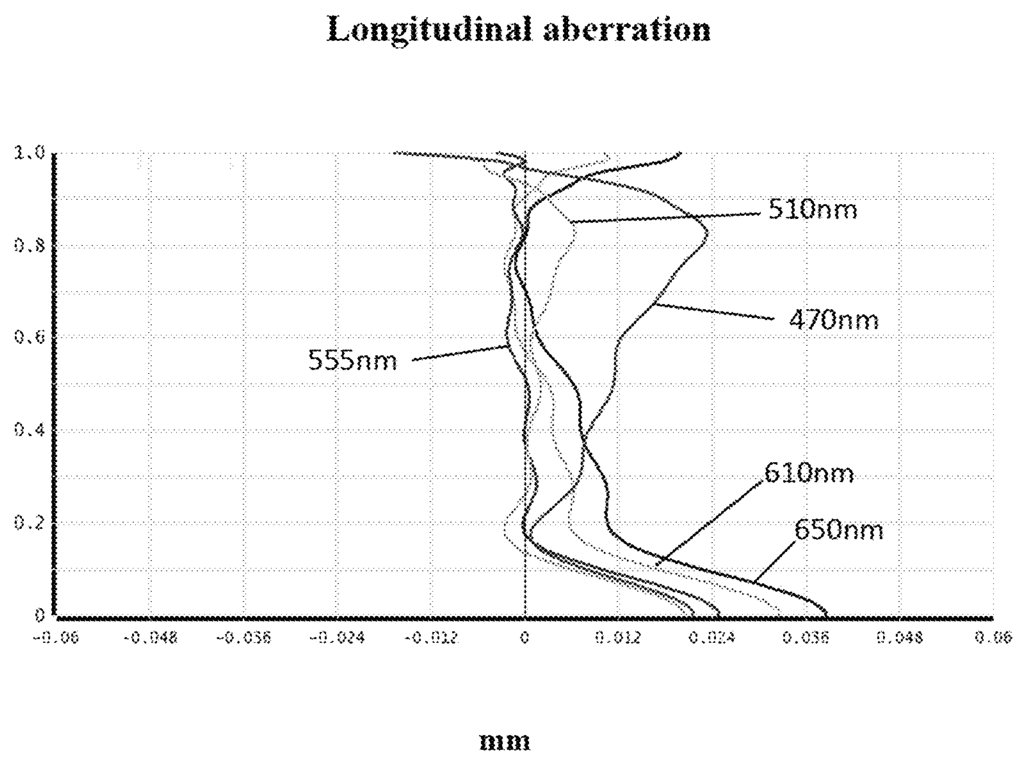
FIG. 6 shows the longitudinal aberration of the camera optical lens shown in FIG. 5.
Figure 7:
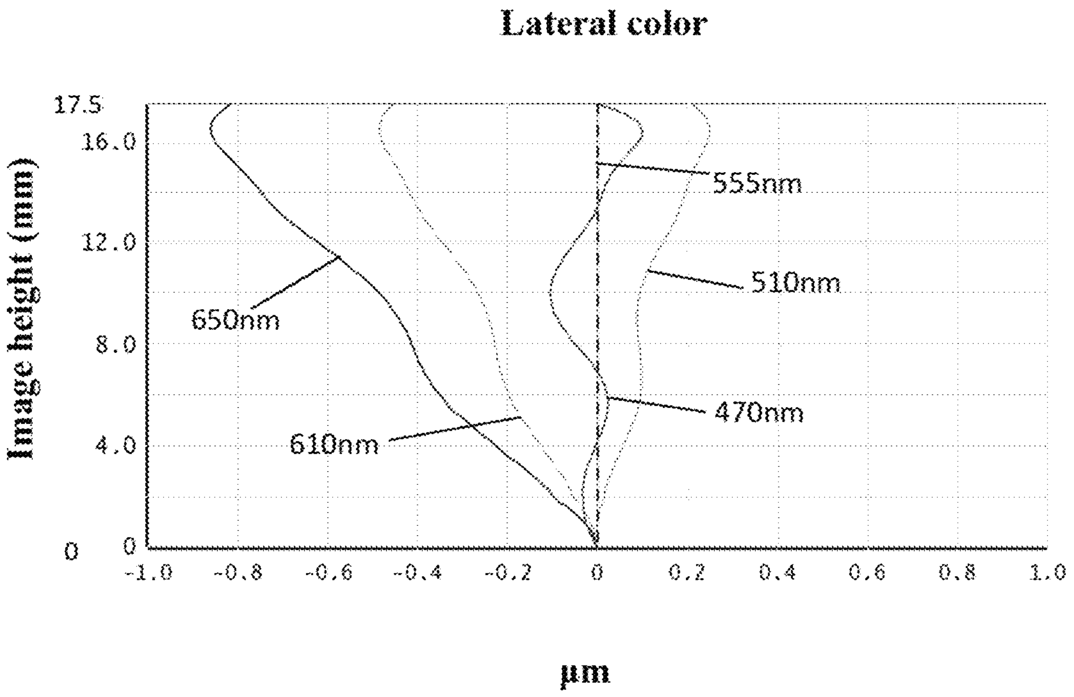
FIG. 7 shows the lateral color of the camera optical lens shown in FIG. 5.
Figure 8:
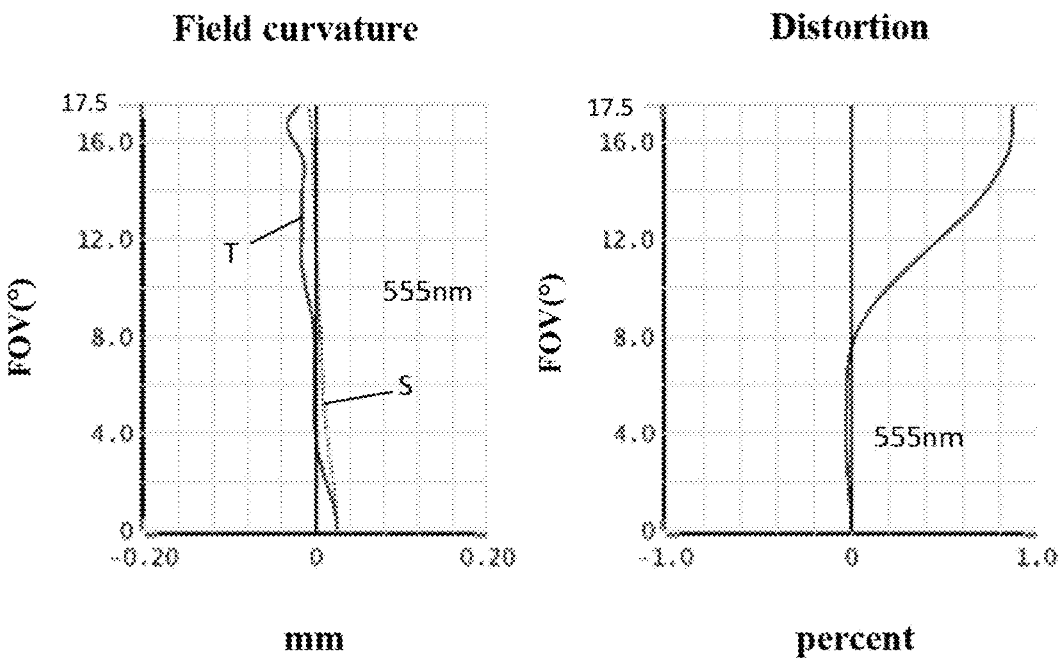
FIG. 8 presents a schematic diagram of the field curvature and distortion of the camera optical lens shown in FIG. 5.

FIG. 6 and FIG. 7 show diagrams of longitudinal aberrations and lateral colors after light with a wavelength of 650 nm, 610 nm, 555 nm, 510 nm, and 470 nm passes the camera optical lens 20 of the second embodiment, respectively. FIG. 8 shows a schematic diagram of a field curvature and distortion after light with a wavelength of 555 nm passes the camera optical lens 20 of the second embodiment. The field curvature S in FIG. 8 is a field curvature in the sagittal direction, and T is a field curvature in the meridian direction.

In this embodiment, the pupil entering diameter ENPD of the camera optical lens 20 is 3.290 mm, the full field-of-view (1.0H) image-height IH is 2.560 mm, and the field of view FOV of the full field-of-view (1.0H) in the diagonal direction is 35.11°. The camera optical lens 20 meets the design requirements of large aperture, long focal length, and ultra-thinness, and the on-axis and off-axis chromatic aberrations are fully corrected, thus having excellent optical characteristics.

Third Embodiment

The meaning of symbols of the third embodiment is the same as that of the first embodiment.

TABLE 5

| | R | d | | nd | | νd | |
|---|---|---|---|---|---|---|---|
| S1 | ∞ | d0= | −0.789 | | | | |
| R1 | 1.933 | d1= | 1.283 | nd1 | 1.5444 | ν1 | 55.82 |
| R2 | −9.555 | d2= | 0.045 | | | | |
| R3 | 3.320 | d3= | 0.306 | nd2 | 1.6700 | ν2 | 19.39 |
| R4 | 1.851 | d4= | 0.389 | | | | |
| R5 | −3.431 | d5= | 0.252 | nd3 | 1.5444 | ν3 | 55.82 |
| R6 | 19.443 | d6= | 2.520 | | | | |
| R7 | −7.191 | d7= | 0.655 | nd4 | 1.6700 | ν4 | 19.39 |
| R8 | −3.394 | d8= | 0.207 | | | | |
| R9 | −1.414 | d9= | 0.504 | nd5 | 1.5444 | ν5 | 55.82 |
| R10 | −1.804 | d10= | 0.360 | | | | |
| R11 | ∞ | d11= | 0.210 | ndg | 1.5168 | νg | 64.17 |
| R12 | ∞ | d12= | 0.450 | | | | |

Table 6 shows aspherical data of each lens in the camera optical lens 30 according to the third embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −4.3910E−03 | −6.3451E−03 | 1.8847E−02 | −2.9718E−02 | −9.3049E−03 | 1.0968E−01 |
| R2 | −3.7309E+01 | −1.6660E−01 | 6.6562E−01 | −1.5911E+00 | 2.7860E+00 | −3.5255E+00 |
| R3 | −6.2379E+01 | −1.3462E−01 | 6.8537E−01 | −3.0629E+00 | 1.0674E+01 | −2.5062E+01 |
| R4 | −9.7031E+00 | 1.2133E−01 | −2.3628E+00 | 2.1980E+01 | −1.2460E+02 | 4.7321E+02 |
| R5 | −8.7762E+01 | 1.7888E−01 | −4.0137E+00 | 4.5124E+01 | −2.8002E+02 | 1.1195E+03 |
| R6 | 0.0000E+00 | −3.4868E−02 | 4.1502E+00 | −3.6682E+01 | 2.1037E+02 | −8.3089E+02 |
| R7 | −2.5581E+01 | −3.8501E−02 | 2.4028E−01 | −1.1455E+00 | 2.9251E+00 | −4.6230E+00 |
| R8 | 1.1259E−01 | 1.5180E−03 | 3.0219E−01 | −1.2929E+00 | 2.4892E+00 | −2.8434E+00 |
| R9 | −7.5715E+00 | −1.4132E−01 | 4.6471E−01 | −1.3624E+00 | 2.2539E+00 | −2.2469E+00 |
| R10 | −9.6195E+00 | −7.1267E−02 | 3.8630E−02 | 1.6981E−02 | −7.8289E−02 | 1.0591E−01 |

| | Conic coefficient | Aspheric surface coefficients | | | | |
|---|---|---|---|---|---|---|
| | k | A14 | A16 | A18 | A20 | / |
| R1 | −4.3910E−03 | −2.0570E−01 | 2.1831E−01 | −1.5154E−01 | 7.1429E−02 | / |
| R2 | −3.7309E+01 | 3.0880E+00 | −1.7296E+00 | 4.7228E−01 | 8.0765E−02 | / |
| R3 | −6.2379E+01 | 3.9927E+01 | −4.3885E+01 | 3.3370E+01 | −1.7264E+01 | / |
| R4 | −9.7031E+00 | −1.2321E+03 | 2.2252E+03 | −2.7845E+03 | 2.3716E+03 | / |
| R5 | −8.7762E+01 | −3.0528E+03 | 5.8343E+03 | −7.8904E+03 | 7.5113E+03 | / |
| R6 | 0.0000E+00 | 2.3298E+03 | −4.7136E+03 | 6.9058E+03 | −7.2592E+03 | / |
| R7 | −2.5581E+01 | 4.8507E+00 | −3.5078E+00 | 1.7765E+00 | −6.2926E−01 | / |
| R8 | 1.1259E−01 | 2.1399E+00 | −1.1154E+00 | 4.1114E−01 | −1.0710E−01 | / |
| R9 | −7.5715E+00 | 1.4573E+00 | −6.4312E−01 | 1.9736E−01 | −4.2227E−02 | / |
| R10 | −9.6195E+00 | −8.3874E−02 | 4.3284E−02 | −1.5136E−02 | 3.6238E−03 | / |

Figure 9:
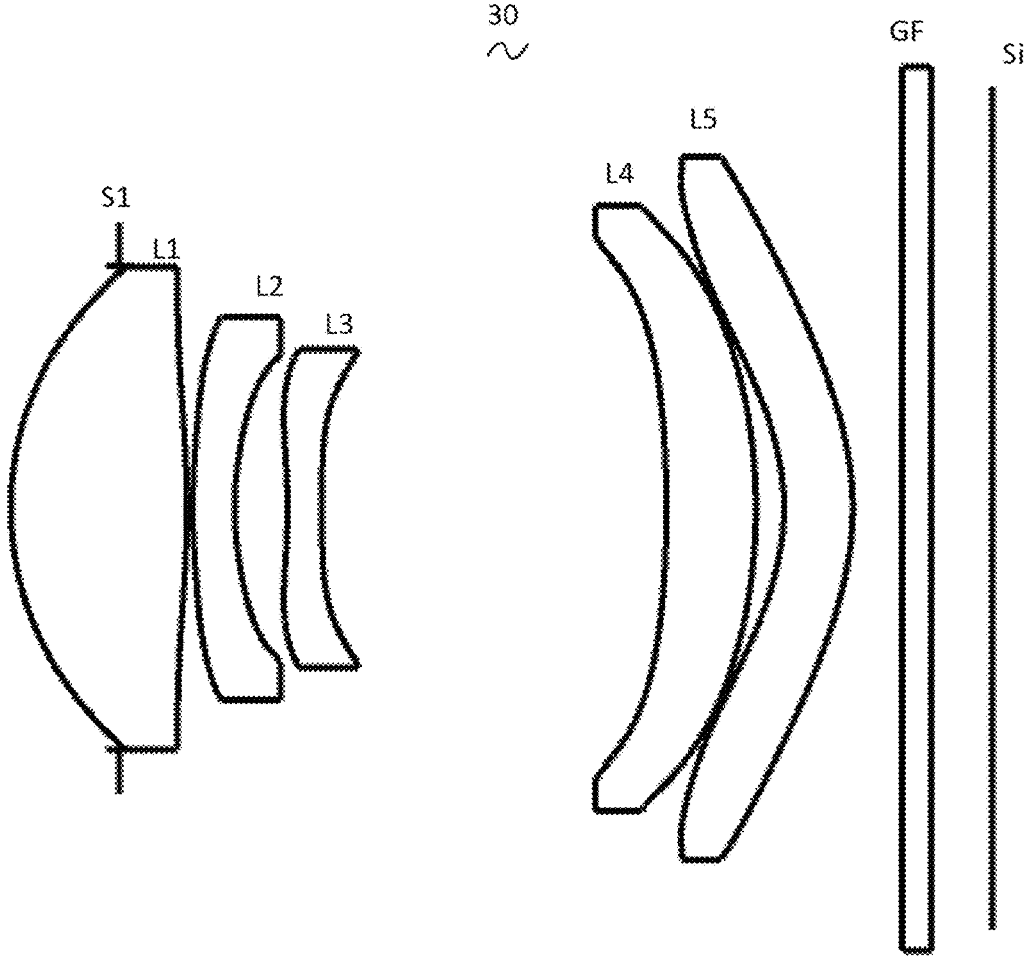
FIG. 9 is a schematic diagram of a camera optical lens in accordance with a third embodiment of the present disclosure.

FIG. 9 shows a camera optical lens 30 according to a third embodiment of the present disclosure.

Table 5 and table 6 show design data of the camera optical lens 30 according to the third embodiment of the present disclosure.

Figure 10:
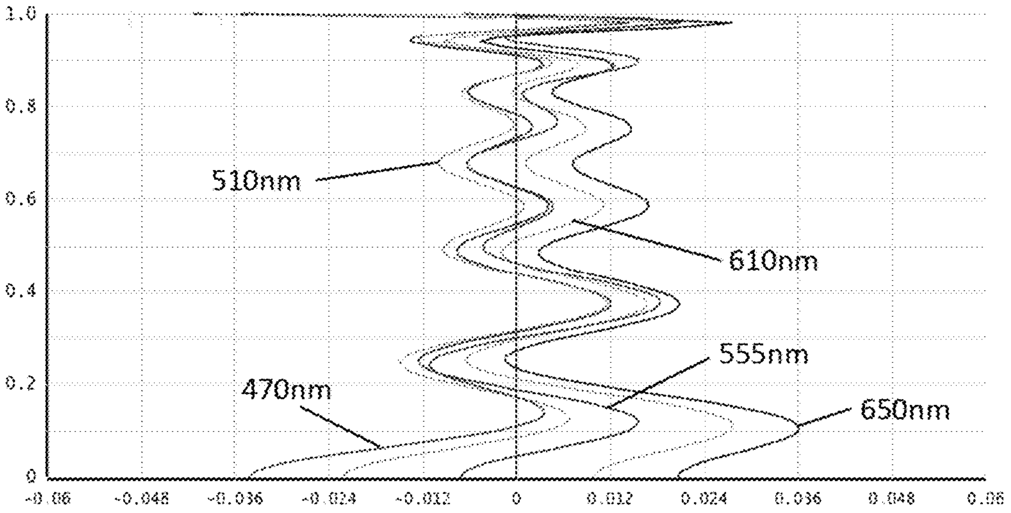
FIG. 10 shows the longitudinal aberration of the camera optical lens shown in FIG. 9.
Figure 11:
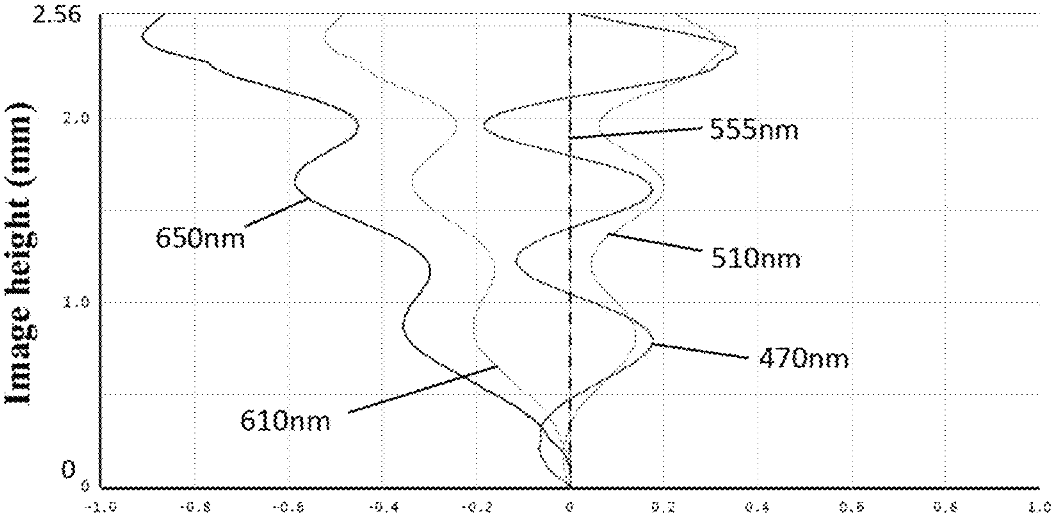
FIG. 11 shows the lateral color of the camera optical lens shown in FIG. 9.
Figure 12:
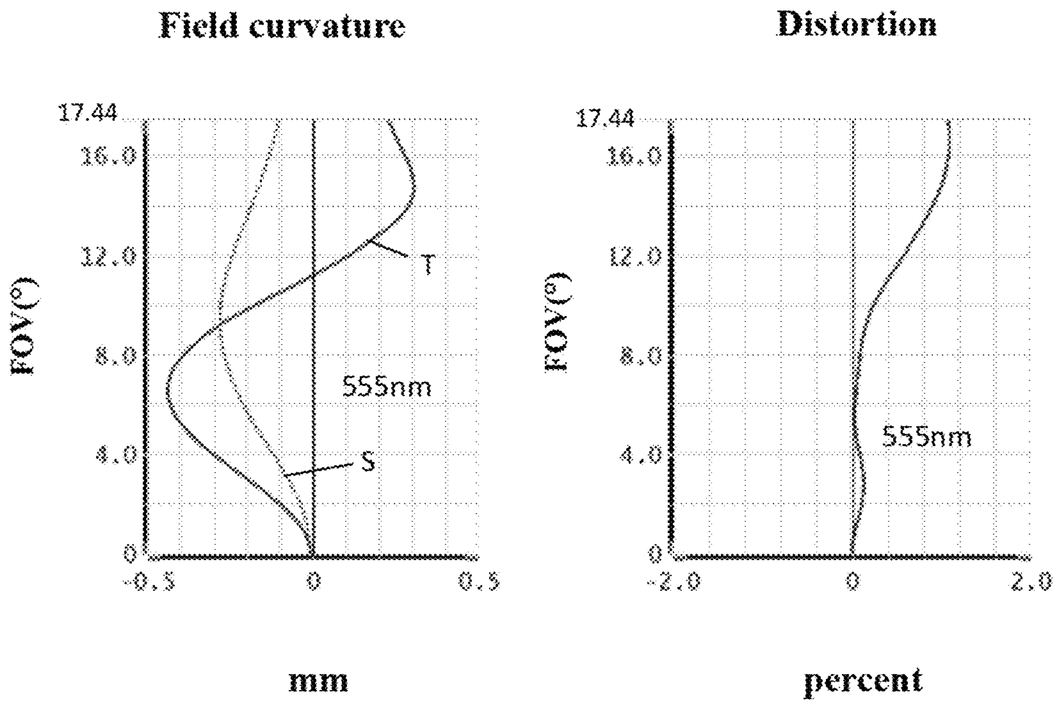
FIG. 12 presents a schematic diagram of the field curvature and distortion of the camera optical lens shown in FIG. 9.

FIG. 10 and FIG. 11 show diagrams of longitudinal aberrations and lateral colors after light with a wavelength of 650 nm, 610 nm, 555 nm, 510 nm, and 470 nm passes the camera optical lens 30 of the third embodiment, respectively. FIG. 12 shows a schematic diagram of a field curvature and distortion after light with a wavelength of 555 nm passes the camera optical lens 30 of the third embodiment. The field curvature S in FIG. 12 is a field curvature in the sagittal direction, and T is a field curvature in the meridian direction.

In this embodiment, the pupil entering diameter ENPD of the camera optical lens 30 is 3.290 mm, the full field-of-view (1.0H) image-height IH is 2.560 mm, and the field of view (FOV) of the full field-of-view (1.0H) in the diagonal direction is 34.88°. The camera optical lens 30 meets the design requirements of large aperture, long focal length, and ultra-thinness, and the on-axis and off-axis chromatic aberrations are fully corrected, thus having excellent optical characteristics.

Fourth Embodiment

The meaning of symbols of the fourth embodiment is the same as that of the first embodiment.

Figure 13:
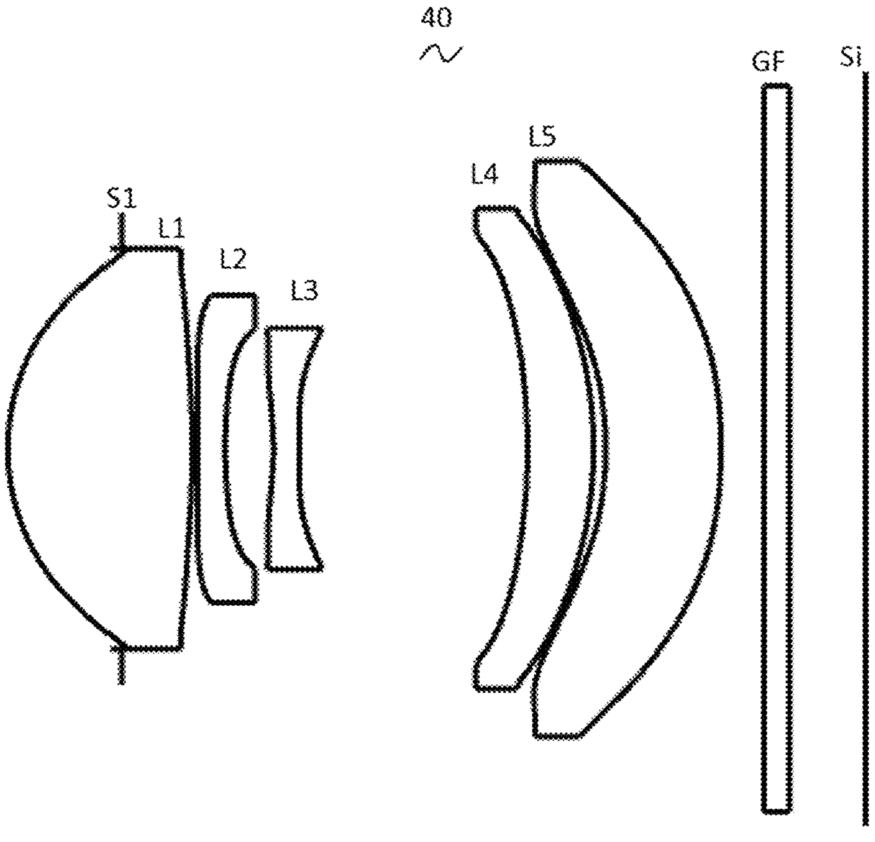
FIG. 13 is a schematic diagram of a camera optical lens in accordance with a fourth embodiment of the present disclosure.

FIG. 13 shows a camera optical lens 40 according to a fourth embodiment of the present disclosure.

Table 7 and table 8 show design data of the camera optical lens 40 according to the fourth embodiment of the present disclosure.

TABLE 7

| | R | | d | | nd | | vd |
|---|---|---|---|---|---|---|---|
| S1 | ∞ | d0= | −0.955 | | | | |
| R1 | 1.815 | d1= | 1.543 | nd1 | 1.5444 | v1 | 55.82 |
| R2 | −9.833 | d2= | 0.048 | | | | |
| R3 | 20.709 | d3= | 0.228 | nd2 | 1.6700 | v2 | 19.39 |
| R4 | 4.118 | d4= | 0.403 | | | | |
| R5 | −2.429 | d5= | 0.212 | nd3 | 1.5444 | v3 | 55.82 |
| R6 | 54.108 | d6= | 1.918 | | | | |
| R7 | −4.812 | d7= | 0.552 | nd4 | 1.6700 | v4 | 19.39 |
| R8 | −3.022 | d8= | 0.102 | | | | |
| R9 | −2.555 | d9= | 0.964 | nd5 | 1.5444 | v5 | 55.82 |
| R10 | −3.860 | d10= | 0.360 | | | | |
| R11 | ∞ | d11= | 0.210 | ndg | 1.5168 | vg | 64.17 |
| R12 | ∞ | d12= | 0.640 | | | | |

Table 8 shows aspherical data of each lens in the camera optical lens 40 according to the fourth embodiment of the present disclosure.

TABLE 8

| | Conic coefficient | Aspheric surface coefficients | | | | |
|---|---|---|---|---|---|---|
| | k | A4 | A6 | A8 | A10 | A12 |
| R1 | 8.3784E−02 | 1.6905E−01 | −1.1550E+00 | 4.4020E+00 | −1.0497E+01 | 1.6702E+01 |
| R2 | −3.2105E+01 | −8.8345E−02 | −4.3378E−01 | 5.9482E+00 | −2.5177E+01 | 6.0794E+01 |
| R3 | −8.9177E+01 | −3.5577E−01 | 8.1758E−01 | 3.5972E+00 | −2.8285E+01 | 8.9278E+01 |
| R4 | −1.8965E+00 | 4.0825E−01 | −1.0046E+01 | 1.0636E+02 | −6.4727E+02 | 2.5384E+03 |
| R5 | −4.9396E+01 | −2.7533E−01 | 6.0583E+00 | −6.5584E+01 | 4.7630E+02 | −2.3059E+03 |
| R6 | 4.6066E+00 | 4.0380E−01 | −1.5837E+00 | 2.1014E+01 | −1.6174E+02 | 7.7369E+02 |
| R7 | −5.0648E+01 | −4.9356E−02 | 2.5739E−01 | −1.2814E+00 | 3.5146E+00 | −5.9181E+00 |
| R8 | −2.2959E+00 | 1.7534E−02 | 5.8130E−01 | −3.0311E+00 | 6.6462E+00 | −8.3173E+00 |
| R9 | −5.8552E+00 | −2.7053E−02 | 6.6921E−01 | −3.4542E+00 | 7.4663E+00 | −9.0954E+00 |
| R10 | −7.1798E−01 | −3.5773E−02 | 4.9737E−02 | −1.6093E−01 | 2.5111E−01 | −2.1977E−01 |

| | Conic coefficient | Aspheric surface coefficients | | | | |
|---|---|---|---|---|---|---|
| | k | A14 | A16 | A18 | A20 | / |
| R1 | 8.3784E−02 | −1.8419E+01 | 1.4367E+01 | −7.9750E+00 | 3.1272E+00 | / |
| R2 | −3.2105E+01 | −9.5842E+01 | 1.0395E+02 | −7.9140E+01 | 4.2285E+01 | / |
| R3 | −8.9177E+01 | −1.7016E+02 | 2.1434E+02 | −1.8291E+02 | 1.0487E+02 | / |
| R4 | −1.8965E+00 | −6.6809E+03 | 1.1894E+04 | −1.3973E+04 | 9.9167E+03 | / |
| R5 | −4.9396E+01 | 7.5707E+03 | −1.7109E+04 | 2.6662E+04 | −2.8210E+04 | / |
| R6 | 4.6066E+00 | −2.5059E+03 | 5.7103E+03 | −9.2771E+03 | 1.0697E+04 | / |
| R7 | −5.0648E+01 | 6.5791E+00 | −5.0338E+00 | 2.7037E+00 | −1.0212E+00 | / |
| R8 | −2.2959E+00 | 6.6554E+00 | −3.6004E+00 | 1.3522E+00 | −3.5461E−01 | / |
| R9 | −5.8552E+00 | 7.0231E+00 | −3.6372E+00 | 1.2967E+00 | −3.1975E−01 | / |
| R10 | −7.1798E−01 | 1.1979E−01 | −4.2131E−02 | 9.3593E−03 | −1.1546E−03 | / |

Figure 14:
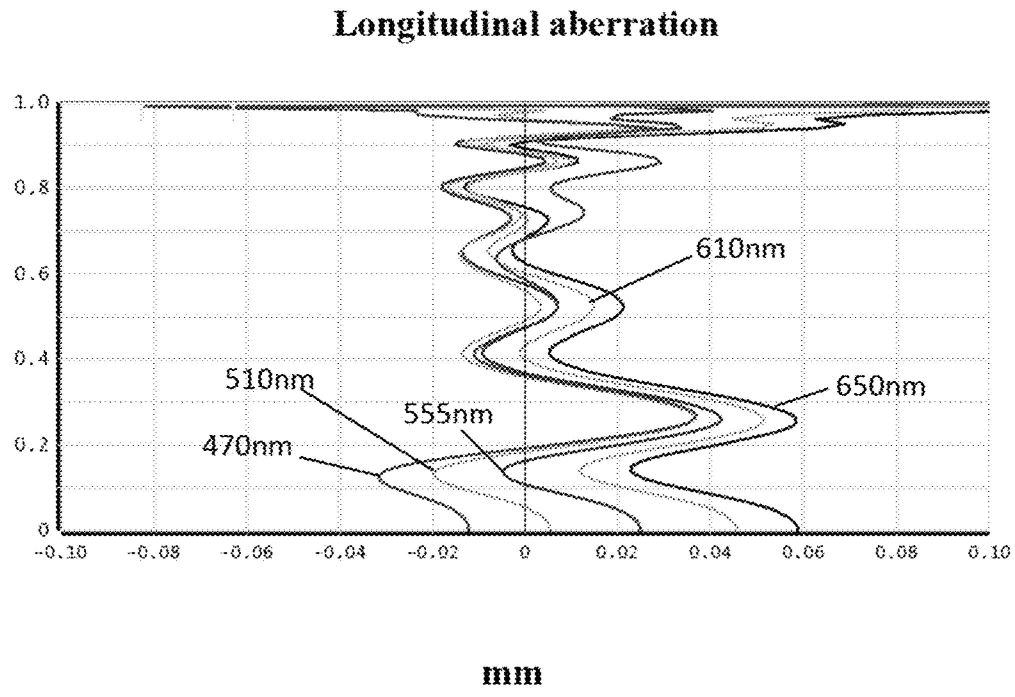
FIG. 14 shows the longitudinal aberration of the camera optical lens shown in FIG. 13.
Figure 15:
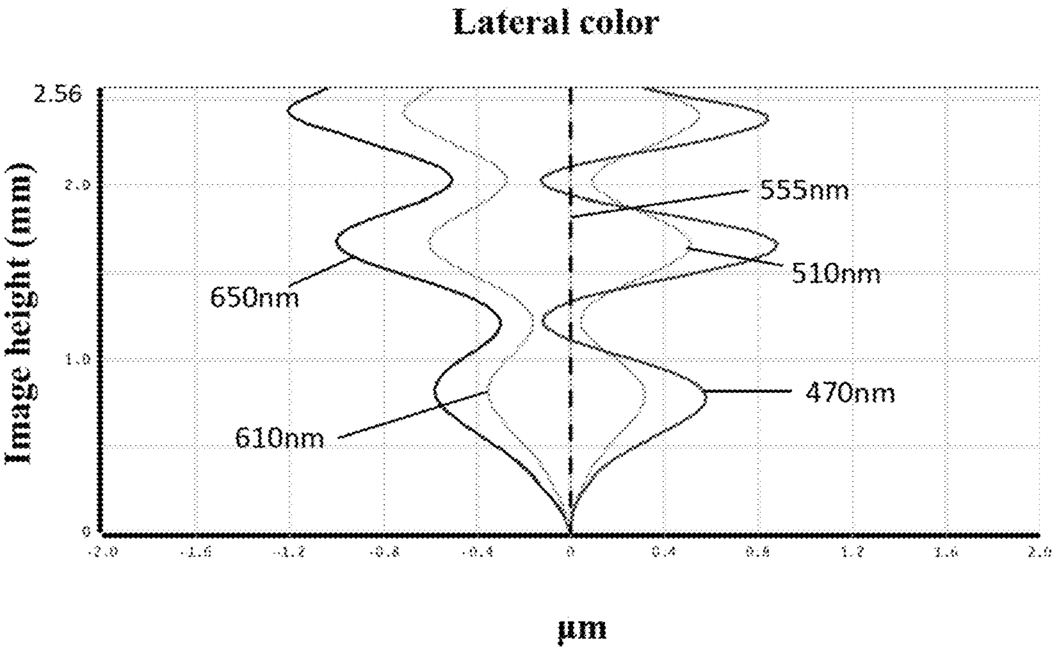
FIG. 15 shows the lateral color of the camera optical lens shown in FIG. 13.
Figure 16:
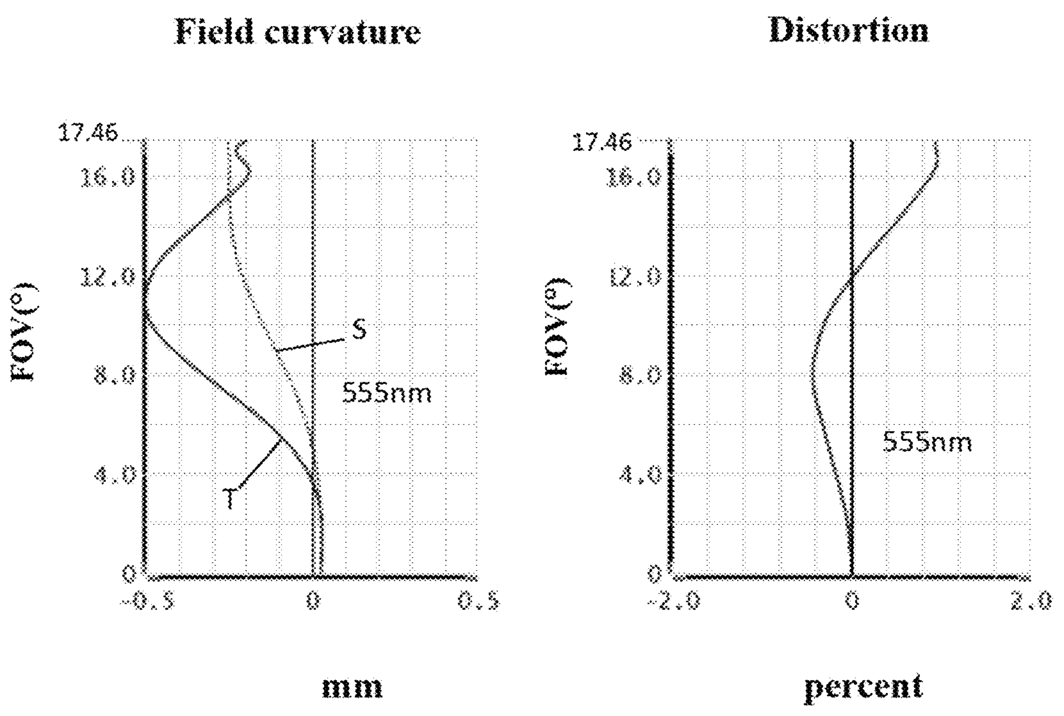
FIG. 16 presents a schematic diagram of the field curvature and distortion of the camera optical lens shown in FIG. 13.

FIG. 14 and FIG. 15 show diagrams of longitudinal aberrations and lateral colors after light with a wavelength of 650 nm, 610 nm, 555 nm, 510 nm, and 470 nm passes the camera optical lens 40 of the fourth embodiment, respectively. FIG. 16 shows a schematic diagram of a field curvature and distortion after light with a wavelength of 555 nm passes the camera optical lens 40 of the fourth embodiment. The field curvature S in FIG. 16 is a field curvature in the sagittal direction, and T is a field curvature in the meridian direction.

In this embodiment, the pupil entering diameter ENPD of the camera optical lens 40 is 3.306 mm, the full field-of-view (1.0H) image-height IH is 2.560 mm, and the field of view (FOV) of the full field-of-view (1.0H) in the diagonal direction is 34.92°. The camera optical lens 40 meets the design requirements of large aperture, long focal length and ultra-thinness, and the on-axis and off-axis chromatic aberrations are fully corrected, thus having excellent optical characteristics.

Fifth Embodiment

The meaning of symbols of the fifth embodiment is the same as that of the first embodiment.

Figure 17:
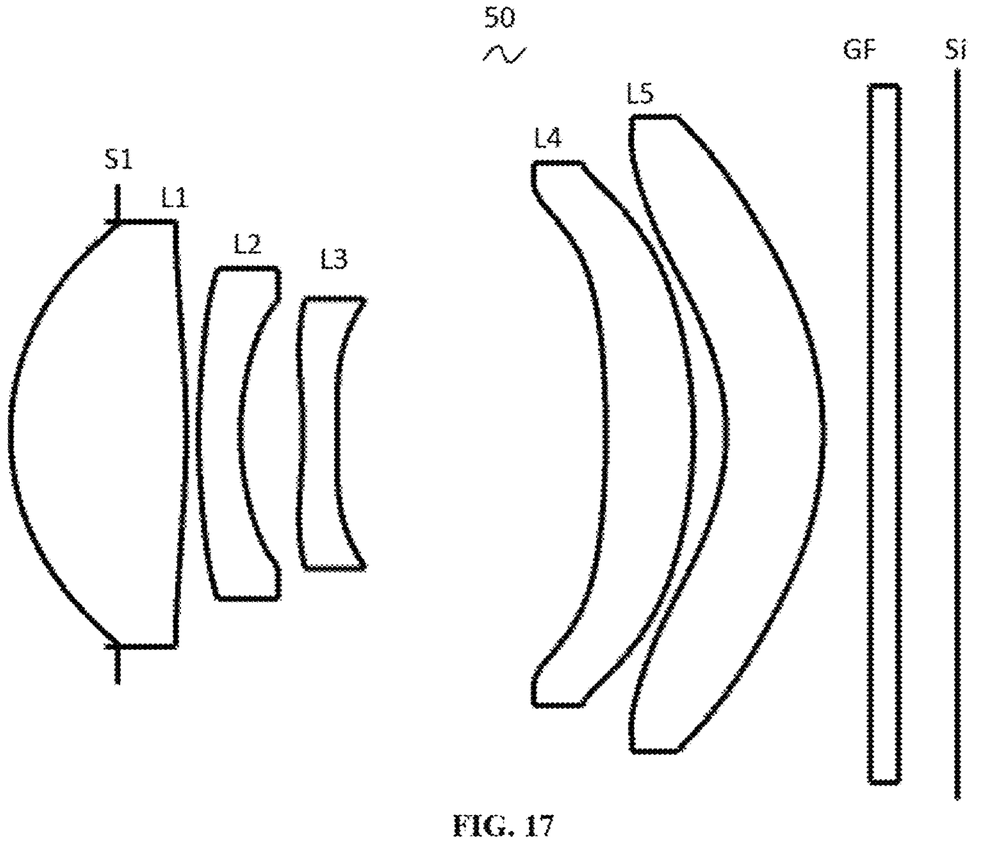
FIG. 17 is a schematic diagram of a camera optical lens in accordance with a fifth embodiment of the present disclosure.

FIG. 17 shows a camera optical lens 50 according to a fifth embodiment of the present disclosure.

Table 9 and table 10 show design data of the camera optical lens 50 of the fifth embodiment of the present disclosure.

TABLE 9

| | R | | d | | nd | | vd |
|---|---|---|---|---|---|---|---|
| S1 | ∞ | d0= | −0.811 | | | | |
| R1 | 1.952 | d1= | 1.329 | nd1 | 1.5444 | v1 | 55.82 |
| R2 | −10.051 | d2= | 0.094 | | | | |
| R3 | 3.873 | d3= | 0.318 | nd2 | 1.6700 | v2 | 19.39 |
| R4 | 1.928 | d4= | 0.474 | | | | |
| R5 | −3.270 | d5= | 0.257 | nd3 | 1.5444 | v3 | 55.82 |
| R6 | 271.435 | d6= | 2.042 | | | | |
| R7 | −7.743 | d7= | 0.664 | nd4 | 1.6700 | v4 | 19.39 |
| R8 | −3.434 | d8= | 0.247 | | | | |
| R9 | −1.783 | d9= | 0.735 | nd5 | 1.5444 | v5 | 55.82 |
| R10 | −2.604 | d10= | 0.360 | | | | |
| R11 | ∞ | d11= | 0.210 | ndg | 1.5168 | vg | 64.17 |
| R12 | ∞ | d12= | 0.450 | | | | |

Table 10 shows aspherical data of each lens in the camera optical lens 50 of the fifth embodiment of the present disclosure.

TABLE 10

| | Conic coefficient | Aspheric surface coefficients | | | |
|---|---|---|---|---|---|
| | k | A4 | A6 | A8 | A10 |
| R1 | 7.5809E−02 | −2.4908E−03 | −4.7107E−02 | 2.6623E−01 | −7.0754E−01 |
| R2 | −3.9260E+01 | −1.8240E−01 | 1.0267E+00 | −3.0489E+00 | 5.7055E+00 |
| R3 | −7.0698E+01 | −2.3603E−01 | 1.6982E+00 | −6.6719E+00 | 1.6854E+01 |
| R4 | −9.9312E+00 | −1.9128E−01 | 2.5537E+00 | −1.7178E+01 | 7.7600E+01 |
| R5 | −7.1011E+01 | 3.4118E−02 | −4.5680E−01 | 8.2146E+00 | −5.0804E+01 |
| R6 | −1.8463E+03 | 3.3594E−01 | −1.4555E+00 | 1.2591E+01 | −6.5175E+01 |
| R7 | −4.2191E+01 | −2.1583E−02 | 5.2277E−03 | 3.7034E−02 | −1.1990E−01 |
| R8 | 5.4373E−02 | 7.5585E−03 | 5.0529E−03 | −7.9903E−03 | 4.3001E−03 |
| R9 | −7.4279E+00 | −8.9341E−02 | 6.9493E−02 | −3.8981E−02 | 1.2738E−02 |
| R10 | −8.7061E+00 | −3.4959E−02 | −1.9374E−02 | 4.8737E−02 | −5.1824E−02 |

| | Conic coefficient | Aspheric surface coefficients | | | |
|---|---|---|---|---|---|
| | k | A12 | A14 | A16 | A18 |
| R1 | 7.5809E−02 | 1.0889E+00 | −1.0565E+00 | 6.6670E−01 | −2.7325E−01 |
| R2 | −3.9260E+01 | −7.0936E+00 | 6.0050E+00 | −3.4750E+00 | 1.3509E+00 |
| R3 | −7.0698E+01 | −2.8889E+01 | 3.4528E+01 | −2.8828E+01 | 1.6457E+01 |
| R4 | −9.9312E+00 | −2.3871E+02 | 5.0522E+02 | −7.3207E+02 | 7.1116E+02 |
| R5 | −7.1011E+01 | 1.8163E+02 | −4.1568E+02 | 6.2740E+02 | −6.2208E+02 |
| R6 | −1.8463E+03 | 2.0963E+02 | −4.3831E+02 | 6.0602E+02 | −5.4996E+02 |
| R7 | −4.2191E+01 | 1.5548E−01 | −1.1867E−01 | 5.8149E−02 | −1.8498E−02 |
| R8 | 5.4373E−02 | −9.9786E−03 | 1.1841E−02 | −6.8659E−03 | 2.2401E−03 |
| R9 | −7.4279E+00 | 4.8645E−04 | −1.7486E−03 | 4.7625E−04 | −2.4814E−05 |
| R10 | −8.7061E+00 | 3.5072E−02 | −1.5512E−02 | 4.5099E−03 | −8.5491E−04 |

| | Conic coefficient | Aspheric surface coefficients | | | |
|---|---|---|---|---|---|
| | k | A20 | A22 | A24 | / |
| R1 | 7.5809E−02 | 7.0162E−02 | −1.0254E−02 | 6.5082E−04 | / |
| R2 | −3.9260E+01 | −3.3662E−01 | 4.8435E−02 | −3.0495E−03 | / |
| R3 | −7.0698E+01 | −6.1055E+00 | 1.3228E+00 | −1.2671E−01 | / |
| R4 | −9.9312E+00 | −4.4186E+02 | 1.5849E+02 | −2.4939E+01 | / |
| R5 | −7.1011E+01 | 3.9008E+02 | −1.4033E+02 | 2.2075E+01 | / |
| R6 | −1.8463E+03 | 3.1503E+02 | −1.0329E+02 | 1.4774E+01 | / |
| R7 | −4.2191E+01 | 3.6854E−03 | −4.1605E−04 | 2.0223E−05 | / |
| R8 | 5.4373E−02 | −4.2576E−04 | 4.4403E−05 | −1.9746E−06 | / |
| R9 | −7.4279E+00 | −9.4539E−06 | 1.6912E−06 | −8.5121E−08 | / |
| R10 | −8.7061E+00 | 1.0182E−04 | −6.9216E−06 | 2.0494E−07 | / |

Figure 18:
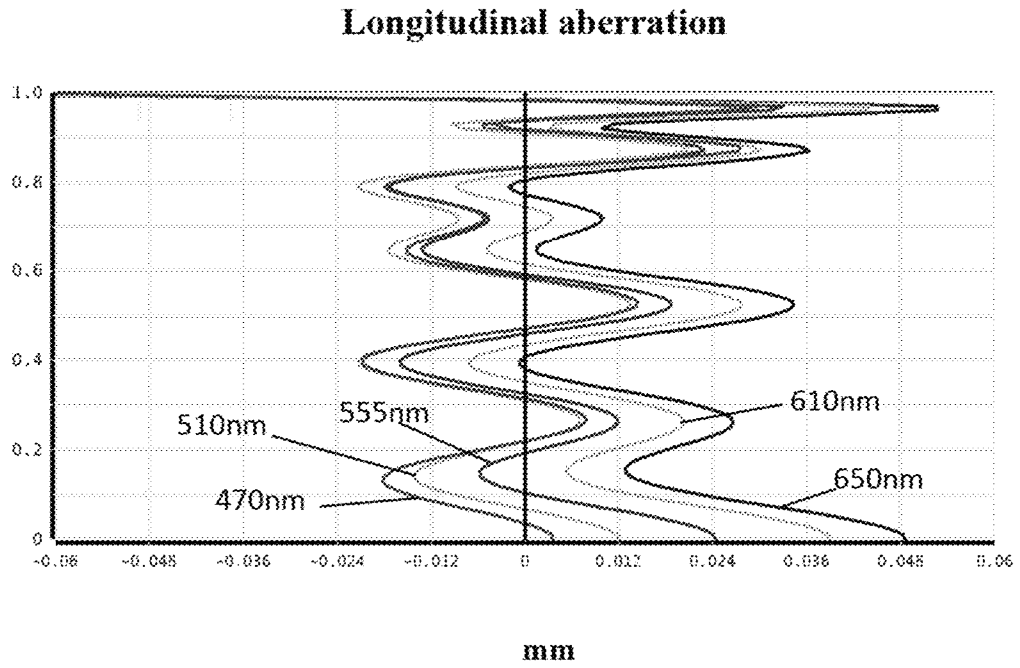
FIG. 18 shows the longitudinal aberration of the camera optical lens shown in FIG. 17.
Figure 19:
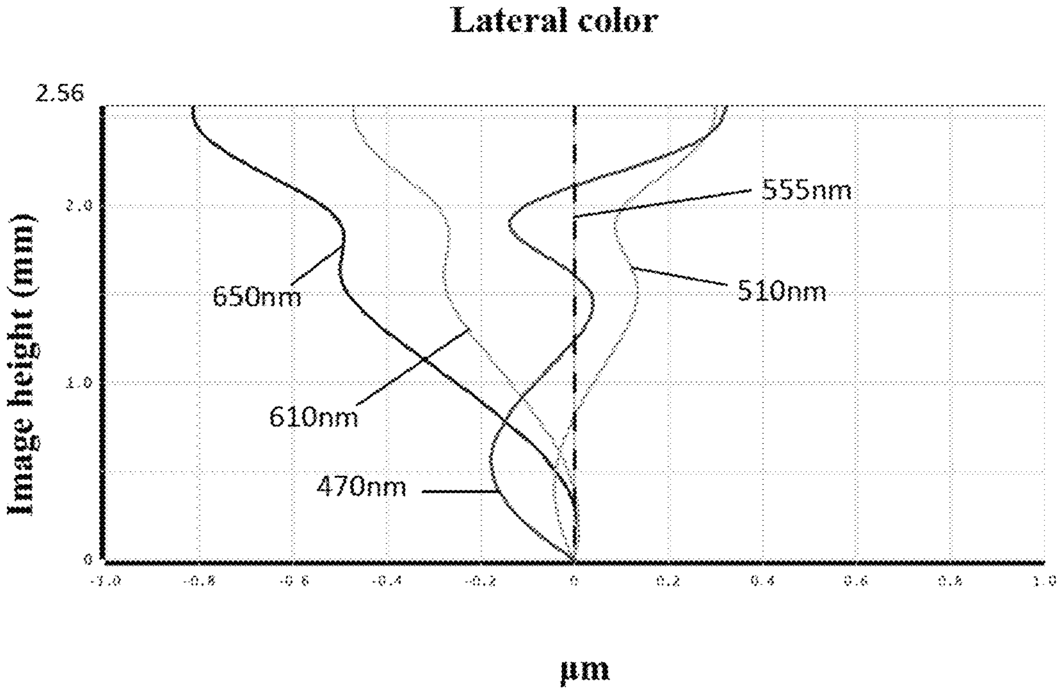
FIG. 19 shows the lateral color of the camera optical lens shown in FIG. 17.
Figure 20:
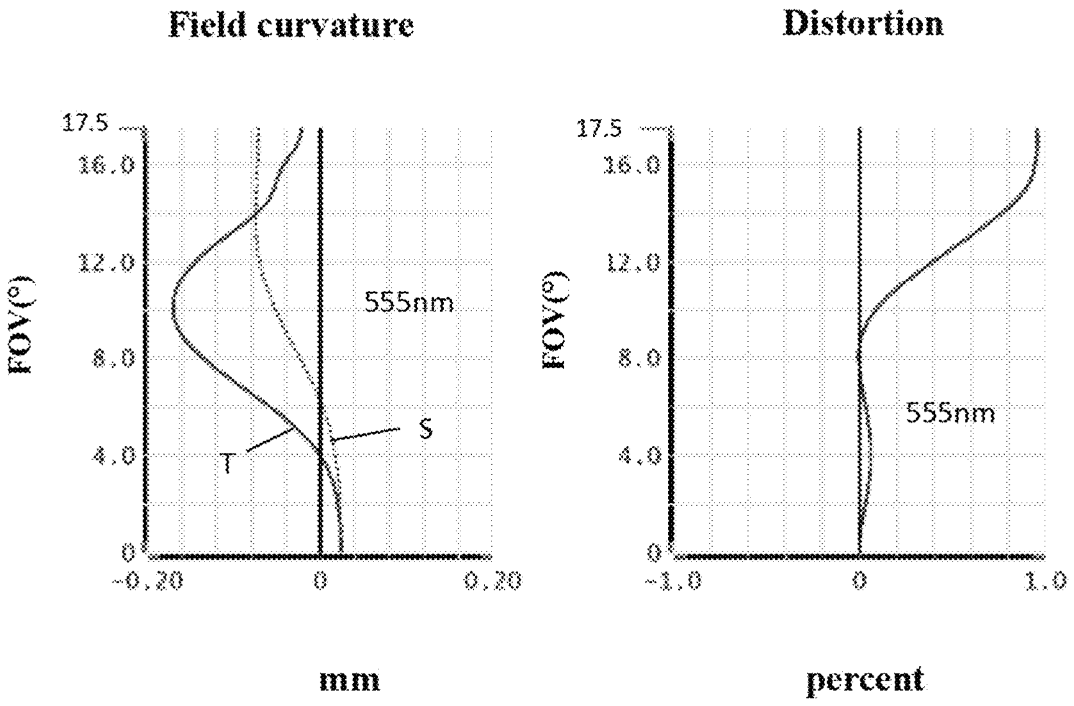
FIG. 20 presents a schematic diagram of the field curvature and distortion of the camera optical lens shown in FIG. 17.

FIG. 18 and FIG. 19 show diagrams of longitudinal aberrations and lateral colors after light with a wavelength of 650 nm, 610 nm, 555 nm, 510 nm, and 470 nm passes the camera optical lens 50 of the fifth embodiment of the present disclosure, respectively. FIG. 20 shows a schematic diagram of a field curvature and distortion after light with a wavelength of 555 nm passes the camera optical lens 50 of the fifth embodiment of the present disclosure. The field curvature S in FIG. 20 is a field curvature in the sagittal direction, and T is a field curvature in the meridian direction.

In this embodiment, the pupil entering diameter ENPD of the camera optical lens 50 is 3.290 mm, the full field-of-view (1.0H) image-height IH is 2.559 mm, and the field of view (FOV) of the full field-of-view (1.0H) in the diagonal direction is 35.01°, such that the camera optical lens 50 does not meet the design requirements of large aperture, long focal length and ultra-thinness, and the on-axis and off-axis chromatic aberrations are fully corrected, thus having excellent optical characteristics.

TABLE 11

| Parameter and conditional formula | Embodiment 1 | Embodiment 2 | Embodiment 3 | Embodiment 4 | Embodiment 5 |
|---|---|---|---|---|---|
| d6/TTL | 0.28 | 0.20 | 0.35 | 0.27 | 0.28 |
| (f4 − f5)/f1 | 8.00 | 6.00 | 10.08 | 9.99 | 7.62 |
| (R5 + R6)/(R5 − R6) | −0.85 | −1.00 | −0.70 | −0.91 | −0.98 |
| (R9 + R10)/f | −0.60 | −0.80 | −0.40 | −0.79 | −0.54 |
| d1/(d3 + d5) | 2.50 | 1.50 | 2.30 | 3.50 | 2.31 |
| SD11*SAG11/IH | 0.53 | 0.40 | 0.54 | 0.65 | 0.54 |
| f | 8.060 | 8.060 | 8.060 | 8.100 | 8.059 |
| f1 | 3.068 | 3.496 | 3.065 | 2.943 | 3.114 |
| f2 | −5.961 | −6.587 | −6.756 | −7.644 | −6.079 |
| f3 | −5.765 | −11.439 | −5.319 | −4.251 | −5.914 |
| f4 | 9.480 | 12.157 | 8.887 | 10.686 | 8.594 |
| f5 | −15.063 | −8.821 | −22.020 | −18.716 | −15.150 |
| FNO | 2.450 | 2.450 | 2.450 | 2.450 | 2.450 |
| TTL | 7.181 | 7.179 | 7.181 | 7.180 | 7.180 |

Those of ordinary skill in the art will appreciate that the above embodiments are embodiments of the present disclosure, and that in practical application, various changes can be made to them in form and detail without departing from the spirit and scope of the present disclosure.

What is claimed is:

1. A camera optical lens, comprising five lenses, wherein the five lenses include, from an object side to an image side in sequence: a first lens having a positive refractive power, a second lens having a negative refractive power, a third lens having a negative refractive power, a fourth lens having a positive refractive power, and a fifth lens having a negative refractive power;

wherein the camera optical lens satisfies following relationships:

$$0.20 \le d6/TTL \le 0.36;$$

$$6.00 \le (f4-f5)/f1 \le 10.10;$$

$$-1.00 \le (R5+R6)/(R5-R6) \le -0.70; \text{ and}$$

$$-0.80 \le (R9+R10)/f \le -0.39;$$

wherein d6 represents an on-axis distance from an image-side surface of the third lens to an object-side surface of the fourth lens, TTL represents a total track length of the camera optical lens, f1 represents a focal length of the first lens, f4 represents a focal length of the fourth lens, f5 represents a focal length of the fifth lens, R5 represents a central curvature radius of an object-side surface of the third lens, R6 represents a central curvature radius of the image-side surface of the third lens, R9 represents a central curvature radius of an object-side surface of the fifth lens, R10 represents a central curvature radius of an image-side surface of the fifth lens, and f represents a focal length of the camera optical lens.

2. The camera optical lens of claim 1, wherein the camera optical lens further satisfies a following relationship:

$$1.50 \le d1/(d3+d5) \le 3.50;$$

wherein d1 represents an on-axis thickness of the first lens, d3 represents an on-axis thickness of the second lens, and d5 represents an on-axis thickness of the third lens.

3. The camera optical lens of claim 1, wherein the camera optical lens further satisfies a following relationship:

$$0.39 \le SD11 * SAG1/IH \le 0.65;$$

wherein SD11 represents an effective radius of an object-side surface of the first lens, SAG11 represents an on-axis distance from an intersection point of the object-side surface of the first lens and the optical axis to a vertex of the effective radius of the object-side surface of the first lens, and IH represents an image height of 1.0H of the camera optical lens.

4. The camera optical lens of claim 1, wherein an object-side surface of the first lens is convex in a paraxial region and an image-side surface of the first lens is convex in the paraxial region;

wherein the camera optical lens further satisfies a following relationship:

$$0.18 \leq f1/f \leq 0.65;$$

$$-1.44 \leq (R1+R2)/(R1-R2) \leq -0.42; \text{ and}$$

$$0.08 \leq d1/TTL \leq 0.32;$$

wherein R1 represents a central curvature radius of the object-side surface of the first lens, R2 represents a central curvature radius of the image-side surface of the first lens, and d1 represents an on-axis thickness of the first lens.

5. The camera optical lens of claim 1, wherein an object-side surface of the second lens is convex in a paraxial region and an image-side surface of the second lens is concave in the paraxial region;

wherein the camera optical lens further satisfies a following relationship:

$$-1.89 \leq f2/f \leq -0.49;$$

$$0.75 \leq (R3+R4)/(R3-R4) \leq 5.28; \text{ and}$$

$$0.02 \leq d3/TTL \leq 0.10;$$

wherein f2 represents a focal length of the second lens, R3 represents a central curvature radius of the object-side surface of the second lens, R4 represents a central curvature radius of the image-side surface of the second lens, and d3 represents an on-axis thickness of the second lens.

6. The camera optical lens of claim 1, wherein the object-side surface of the third lens is concave in a paraxial region and the image-side surface of the third lens is concave in the paraxial region;

wherein the camera optical lens further satisfies a following relationship:

$$-2.84 \leq f3/f \leq -0.35; \text{ and}$$

$$0.01 \leq d5/TTL \leq 0.06;$$

wherein f3 represents a focal length of the third lens, and d5 represents an on-axis thickness of the third lens.

7. The camera optical lens of claim 1, wherein the object-side surface of the fourth lens is concave in a paraxial region and an image-side surface of the fourth lens is convex in a paraxial region;

wherein the camera optical lens further satisfies a following relationship:

$$0.53 \leq f4/f \leq 2.26;$$

$$1.30 \leq (R7+R8)/(R7-R8) \leq 10.54; \text{ and}$$

$$0.04 \leq d7/TTL \leq 0.14;$$

wherein R7 represents a central curvature radius of an object-side surface of the fourth lens, R8 represents a central curvature radius of an image-side surface of the fourth lens, and d7 represents an on-axis thickness of the fourth lens.

8. The camera optical lens of claim 1, wherein the object-side surface of the fifth lens is concave in a paraxial region and the image-side surface of the fifth lens is convex in the paraxial region;

wherein the camera optical lens further satisfies a following relationship:

$$-5.46 \leq f5/f \leq -0.73;$$

$$-16.50 \leq (R9+R10)/(R9-R10) \leq -2.05; \text{ and}$$

$$0.03 \leq d/TTL \leq 0.20;$$

wherein d9 represents an on-axis thickness of the fifth lens.

9. The camera optical lens of claim 1, wherein the camera optical lens further satisfies a following relationship:

$$f/FOV \geq 8.10;$$

wherein FOV represents a field of view of 1.0H of the camera optical lens.

10. The camera optical lens of claim 1, wherein the camera optical lens further satisfies a following relationship:

$$FNO \leq 2.40;$$

wherein FNO represents an aperture value of the camera optical lens.

* * * * *